United States Patent
Shveidel et al.

(10) Patent No.: US 12,468,995 B2
(45) Date of Patent: Nov. 11, 2025

(54) MAINTENANCE BACKGROUND TASK REGULATION USING FEEDBACK FROM INSTRUMENTED WAITING POINTS

(71) Applicant: Dell Products L.P., Hopkinton, MA (US)

(72) Inventors: Vladimir Shveidel, Pardes-Hana (IL); Lior Kamran, Rishon LeZion (IL)

(73) Assignee: Dell Products L.P., Hopkinton, MA (US)

( * ) Notice: Subject to any disclaimer, the term of this patent is extended or adjusted under 35 U.S.C. 154(b) by 572 days.

(21) Appl. No.: 17/951,620

(22) Filed: Sep. 23, 2022

(65) Prior Publication Data
US 2024/0104468 A1  Mar. 28, 2024

(51) Int. Cl.
*G06Q 10/0633* (2023.01)
*G06F 9/50* (2006.01)

(52) U.S. Cl.
CPC ........ *G06Q 10/0633* (2013.01); *G06F 9/505* (2013.01)

(58) Field of Classification Search
None
See application file for complete search history.

(56) References Cited

U.S. PATENT DOCUMENTS

| | | | |
|---|---|---|---|
| 7,137,019 B2 * | 11/2006 | Hellerstein | G06F 9/4843 713/323 |
| 2020/0034073 A1 * | 1/2020 | Saha | G06F 3/067 |
| 2021/0141668 A1 * | 5/2021 | Kumar | G06F 9/5038 |
| 2021/0232425 A1 * | 7/2021 | Cox | G06F 11/3017 |

OTHER PUBLICATIONS

U.S. Appl. No. 17/148,872, filed Jan. 14, 2021, entitled Scheduling Storage System Tasks to Promote Low Latency and Sustainability, to Vladimir Shveidel, et al.

* cited by examiner

*Primary Examiner* — Mustafa A Amin
(74) *Attorney, Agent, or Firm* — BainwoodHuang

(57) ABSTRACT

Regulating maintenance background (BG) task activity using instrumented waiting points (WPs) can include: collecting feedback metrics for the WPs, where each WP is instrumented to collect a set of feedback metrics including an average waiting time and a first value denoting a portion of resource requests received at the WP which are from maintenance BG tasks; determining, in accordance with criteria and collected feedback metrics, whether the criteria is true for at least a first WP associated with a set of feedback metrics, wherein the criteria includes determining whether the first WP has an associated average waiting time of the set which exceeds a waiting time threshold, and whether the first WP has a share of maintenance BG requests exceeding a minimum; and responsive to determining that the criteria is true for at least the first WP, performing processing to reduce a current activity level of said maintenance BG tasks.

20 Claims, 11 Drawing Sheets

MAINTENANCE BACKGROUND TASK REGULATION USING FEEDBACK FROM INSTRUMENTED WAITING POINTS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O (input/output) operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system and a non-transitory computer readable medium comprising: collecting a plurality of sets of feedback metrics for a plurality of waiting points (WPs), wherein each WP of the plurality of WPs is instrumented to collect a corresponding one of the plurality of sets of feedback metrics at said each WP, wherein each set of feedback metrics of the plurality of sets associated with one WP of the plurality of WPs includes an average waiting time for said one WP and includes a first percentage for said one WP, wherein the average waiting time for said one WP denotes an average amount of time a task waits for one or more resources at said one WP and wherein the first percentage denotes a share or portion of resource requests received at said one WP which are from maintenance background (BG) tasks; determining, in accordance with criteria and said plurality of sets of feedback metrics, whether said criteria is true for at least a first WP of the plurality of WPs for which a first set of the plurality of sets of feedback metrics is collected, wherein said criteria includes determining whether said first WP has an associated average waiting time of the first set which exceeds a waiting time threshold, and wherein said criteria includes determining whether said first percentage of the first set exceeds a minimum percentage; and responsive to determining that said criteria is true for at least the first WP, performing first processing to reduce a current activity level of said maintenance BG tasks.

In at least one embodiment, each WP of the plurality of WPs can denote a workflow processing point in I/O operation workflow processing where a task waits to access one or more resources. A first task waiting at the first WP can be waiting to access first one or more resources at a first workflow processing point and can issue a corresponding first request to access the first one or more resources at the first workflow processing point, and wherein the corresponding first request can be placed on a first queue associated with said first WP.

In at least one embodiment, the first processing can be performed by a regulator that controls and regulates the current activity level of maintenance BG tasks. The first processing can include said regulator performing one or more actions to reduce the current activity level of maintenance BG tasks. The first processing can include the regulator temporarily not creating any additional maintenance BG task instances for scheduling and execution on a data storage system. The first processing can include the regulator temporarily reducing a number of maintenance BG task instances created for scheduling and execution. The first processing can include the regulator notifying a scheduler to temporarily stop dequeuing for execution instances of maintenance BG tasks which are ready and waiting for execution.

In at least one embodiment, the regulator can use a first table of information denoting resources acquired at the plurality of WPs and uses a second table of information denoting required resources used by a plurality of maintenance BG task types. The first table of information can indicate, for each of the plurality of WPs, one or more resources acquired at said each WP. The second table of information can indicate, for each task type of the plurality of maintenance BG task types, one or more resources required or used by task instances of said each task type. The regulator can use the first table to determine, for the first WP, a first resource set of one or more resources acquired at said first WP. The regulator can use the second table to determine a first task type of the plurality of maintenance BG task types which does not use any resource in the first resource set associated with the first WP. The regulator may not perform any action to reduce a first current activity level of maintenance BG tasks instances of the first task type. The regulator can continue to create and schedule for execution maintenance BG task instances of the first task type in order to maintain the first current activity level. The regulator can use the second table to determine a second task type of the plurality of maintenance BG task types which does use one or more of the resources in the first resource set associated with the first WP. The regulator can perform one or more actions to reduce a second current activity level of maintenance BG tasks instances of the second task type. The one or more actions can include a first action where the regulator temporarily stops creating for execution maintenance BG task instances of the second task type. The first processing can include the regulator notifying a scheduler to temporarily stop dequeuing for execution instances of maintenance BG tasks of the second task type which are ready and waiting for execution.

BRIEF DESCRIPTION OF THE DRAWINGS

Features and advantages of the present disclosure will become more apparent from the following detailed description of exemplary embodiments thereof taken in conjunction with the accompanying drawings in which.

Figure 1:
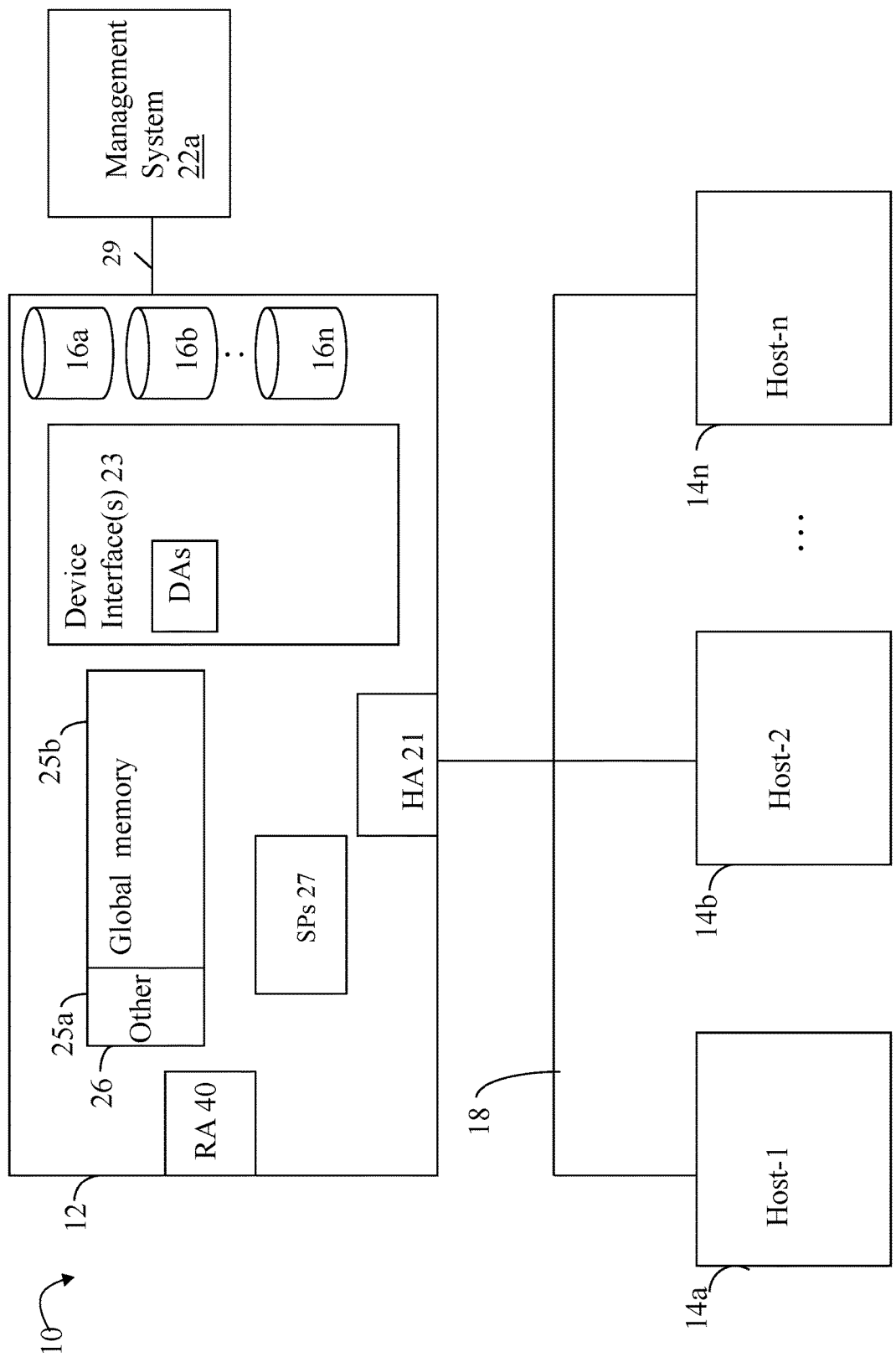
FIG. 1 is an example of components of at least one embodiment of system in accordance with the techniques of the present disclosure.

DETAILED DESCRIPTION OF
EMBODIMENT(S)

A data storage system can generally perform many different types of workflows or tasks to provide continuous service. Such workflows or tasks can include synchronous I/O processing tasks, critical background tasks such as asynchronous I/O processing tasks, and different types of maintenance background (BG) tasks. Examples of critical background tasks which are asynchronous I/O processing tasks can include destaging or flushing a data log and/or metadata (MD) log. Examples of maintenance BG tasks can include garbage collection (GC), background deduplication, logical device deletion, snapshot merge operations, RAID group rebuild operations, and the like. The foregoing tasks or workflows have different levels of importance as well as different constraints and limitations. In existing data storage systems, tasks such as the foregoing can be scheduled for execution according to one or more policies.

Maintenance BG task regulation can be characterized as a non-trivial task. On one hand, it is desirable to utilize resources efficiently where, in some existing systems, all the idle CPU cycles can be used for executing maintenance BG tasks. However, excessively performing maintenance BG tasks can have adverse effects, such as lock contention, and can also adversely impact I/O latency even at times when the CPU may not be fully utilized. To avoid adversely impacting I/O latency by having I/O latency become excessive, end-to-end I/O latency can be observed and provided as a feedback for regulating maintenance BG tasks. In such systems, maintenance BG task execution can be reduced or eliminated at various points in time responsive to the I/O latency exceeding a maximum threshold.

One problem with using end-to-end I/O latency to regulate maintenance BG task execution is that such end-to-end I/O latency may not provide sufficiently precise feedback since such I/O latency can generally depend on many factors and can increase independent of maintenance BG activity. In many cases in existing systems, maintenance BG task execution can be reduced or eliminated responsive to excessive end-to-end I/O latency even in cases when such reduction does not result in an improvement in I/O latency. Thus, system resources can be underutilized.

To overcome the above-noted drawbacks, such as resource underutilization, and provide improved control and regulation of maintenance BG task scheduling and execution, described in the following paragraphs are techniques that can be used regulate the scheduling and execution of maintenance BG tasks using instrumented waiting points (WPs). Such WPs can be instrumented to provide feedback, such as in the form of one or more metrics or statistics, which can be used to regulate and vary the level of maintenance BG task execution and activity in the system. In at least one embodiment, a WP can generally be any workflow or processing point during task execution where an executing thread, process, or other code entity may be waiting for at least one resource or object such as, for example, access to a BE PD or other hardware component, waiting to acquire a lock, waiting for a free entry in the data log or MD log, and the like.

In at least one embodiment in accordance with the techniques of the present disclosure, a WP can provide the following feedback: I/O flow waiting time associated with the WP (e.g., WP waiting time or WP I/O waiting time); overall request bandwidth or rate of the WP; and a metric, such as a percentage, denoting the portion or share of the overall requests of the WP which are maintenance BG task requests for the WP. For example, the WP waiting time can denote an average amount of time a thread waits for a resource or object at the WP; the overall request bandwidth or rate can be 100 requests per second (e.g., or other unit of time); and a percentage can denote the portion or share of the overall requests of the WP which are maintenance BG requests for the WP. For example, the percentage can be 10% indicating the share, portion or contribution of maintenance BG tasks with respect to all task resource requests received at the WP. In this manner, the percentage can denote a weighting, significance or contribution of maintenance BG tasks to the observed WP's I/O wait time.

In at least one embodiment, a maintenance BG regulator can be a process which regulates, controls and can vary the activity level of maintenance BG tasks. The maintenance BG regulator can monitor and receive feedback from the instrumented WPs of the system. In at least one embodiment, the maintenance BG regulator can determine when the following criteria evaluates to true for at least one WP: the WP I/O waiting time exceeds a waiting time threshold associated with the particular WP; and the percentage or share of the overall requests of the WP which are maintenance BG requests for the WP exceeds a minimum threshold, such as a minimum percentage. If the foregoing criteria for at least one WP evaluates to true, the maintenance BG regulator can reduce the activity level of maintenance BG tasks.

In at least one embodiment, at least some of the WPs can be instrumented to provide feedback to the maintenance BG regulator.

In at least one embodiment, tasks or threads which can pass through or include processing resulting in traversal of one or more of the instrumented WPs can be classified into multiple classes. The classes can include 3 classes with associated relative priorities. The classes can include: latency critical tasks (LCTs) which can include synchronous I/O processing tasks such as I/O request tasks for receiving and responding to I/O requests; critical background tasks or bandwidth critical tasks (BCTs) such as asynchronous I/O processing tasks which can include background I/O tasks for storing logged write data and metadata associated with write I/O requests on back-end persistent storage in suitable storage structures; and maintenance BG tasks. The foregoing 3 classes can have an associated relative priority, from highest to lowest of: a first class C1 of LCTs; a second class C2 of BCTs; and a third class C3 of maintenance BG tasks. In at least one embodiment, at least some of the WPs can perform prioritization of requests for resources which arrive at, and pass through, the WPs, where such prioritization can be in accordance with the above-noted relative priorities of tasks. Additionally, a WP can also prioritize requests from associated tasks for processing in accordance with quotas or shares associated with the priorities. For example, during a specified CPU execution cycle time (or more generally resource usage cycle time), requests from tasks of the first class can have a first quota denoting a first amount of execution time; requests from the second class can have a second quota denoting a second amount of execution time; and requests from the third class can have a third quota denoting a third amount of execution time. In at least one embodiment, the third amount of execution time for maintenance BG tasks can be zero whereby the quotas or shares of the first and second classes of tasks and associated requests can collectively account for 100% of a scheduling cycle. The quota or share of a class can denote an amount of access allocated to the class, and the priority sets an order in which the class can use its quota or share, with higher priority classes getting access to utilize their associated share or quota prior to lower priority classes. In at least one embodiment, the quota or share of a class be expressed using a percentage denoting a percentage of each scheduling cycle allocated to the associated class. In at least one embodiment, tasks or requests of the third class can be run when both the first and second classes have no tasks ready to run. In at least one embodiment, tasks of the first class can run in a scheduling cycle before any other class so long as the first quota or share of the cycle has not been consumed.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 can be connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, also be located in different physical locations. The communication medium 18 used for communication between the host systems 14a-14n and the data storage system 12 of the system 10 can use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques of the present disclosure. It should also be noted that an embodiment can include data storage arrays or other components from one or more vendors.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs can refer to solid state electronics devices as distinguished from electromechanical devices, such as hard drives, having moving parts. Flash devices or flash memory-based SSDs are one type of SSD that contains no moving mechanical parts. The flash devices can be constructed, for example, using nonvolatile semiconductor NAND flash memory.

The data storage system can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA)

or other adapter which facilitates host communication. The HA 21 can be characterized as a front end component of the data storage system which receives a request from one of the hosts 14*a-n*. The data storage system can include one or more RAs used, for example, to facilitate communications between data storage systems. The data storage system can also include one or more device interfaces 23 for facilitating data transfers to/from the data storage devices 16*a*-16*n*. The data storage device interfaces 23 can include device interface modules, for example, one or more disk adapters (DAs) (e.g., disk controllers) for interfacing with the flash drives or other physical storage devices (e.g., PDS 16*a-n*). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25*b* can be used to facilitate data transfers and other communications between the device interfaces, the HAs and/or the RAs in a data storage system. In one embodiment, the device interfaces 23 can perform data operations using a system cache that can be included in the global memory 25*b*, for example, when communicating with other device interfaces and other components of the data storage system. The other portion 25*a* is that portion of the memory that can be used in connection with other designations that vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14*a*-14*n* provide data and access control information through channels to the storage systems 12, and the storage systems 12 can also provide data to the host systems 14*a-n* also through the channels. The host systems 14*a-n* do not address the drives or devices 16*a*-16*n* of the storage systems directly, but rather access to data can be provided to one or more host systems from what the host systems view as a plurality of logical devices, logical volumes (LVs) which can also referred to herein as volumes or logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage referenced by such logical unit numbers. The LUNs may or may not correspond to the actual or physical disk drives or more generally physical storage devices. For example, one or more LUNs can reside on a single physical disk drive, data of a single LUN can reside on multiple different physical devices, and the like. Data in a single data storage system can be accessed by multiple hosts allowing the hosts to share the data residing therein. The HAs can be used in connection with communications between a data storage system and a host system. The RAs can be used in facilitating communications between two data storage systems. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques of the present disclosure, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques of the present disclosure can be be made with respect to a physical data storage system and its physical components (e.g., physical hardware for each HA, DA, HA port and the like), the techniques of the present disclosure can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22*a* used to manage and monitor the data storage system 12. In one embodiment, the management system 22*a* can be a computer system which includes data storage system management software or application executing in a web browser. A data storage system manager can, for example, view information about a current data storage configuration such as LUNs, groups of LUNs, and the like, on a user interface (UI) in a display device of the management system 22*a*. Alternatively, and more generally, the management software can execute on any suitable processor in any suitable system. For example, the data storage system management software can execute on a processor of the data storage system 12.

In some embodiments, each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16*a*-16*n*. In the following description, data residing on a LUN can be accessed by the device interface following a data request in connection with I/O operations. For example, a host can issue an I/O operation which is received by the HA 21. The I/O operation can identify a target logical address from which data is read from, or written to, depending on whether the I/O operation is, respectively, a read or a write operation request. The target logical address of the received I/O operation can be expressed in terms of a LUN or volume and logical address or offset location (e.g., LBA or logical block address) on the LUN. Processing can be performed on the data storage system to further map the target logical address of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system that includes multiple storage processors (SPs). Each of the SPs 27 can y be a CPU including one or more "cores" or processors and each can have their own memory used for communication between the different front end and back end components rather than utilize a global memory accessible to all storage processors. In such embodiments, the memory 26 can represent memory of each such storage processor.

Generally, the techniques of the present disclosure can be used in connection with any suitable storage system, appliance, device, and the like, in which data is stored.

The data path or I/O path can be characterized as the path or flow of I/O data through a system. For example, the data or I/O path is the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12.

The data path and control path define two sets of different logical flow paths. In at least some of the data storage system configurations, at least part of the hardware and network connections used for each of the data path and control path can differ. For example, although both control path and data path generally use a network for communications, some of the hardware and software used can differ. For example, with reference to the FIG. 1, a data storage system can have a separate physical connection 29 from a management system 22a to the data storage system 12 being managed whereby control commands are issued over such a physical connection 29. However, user I/O commands may never be issued over such a physical connection 29 provided solely for purposes of connecting the management system to the data storage system. In any case, the data path and control path each define two separate logical flow paths.

Figure 2:
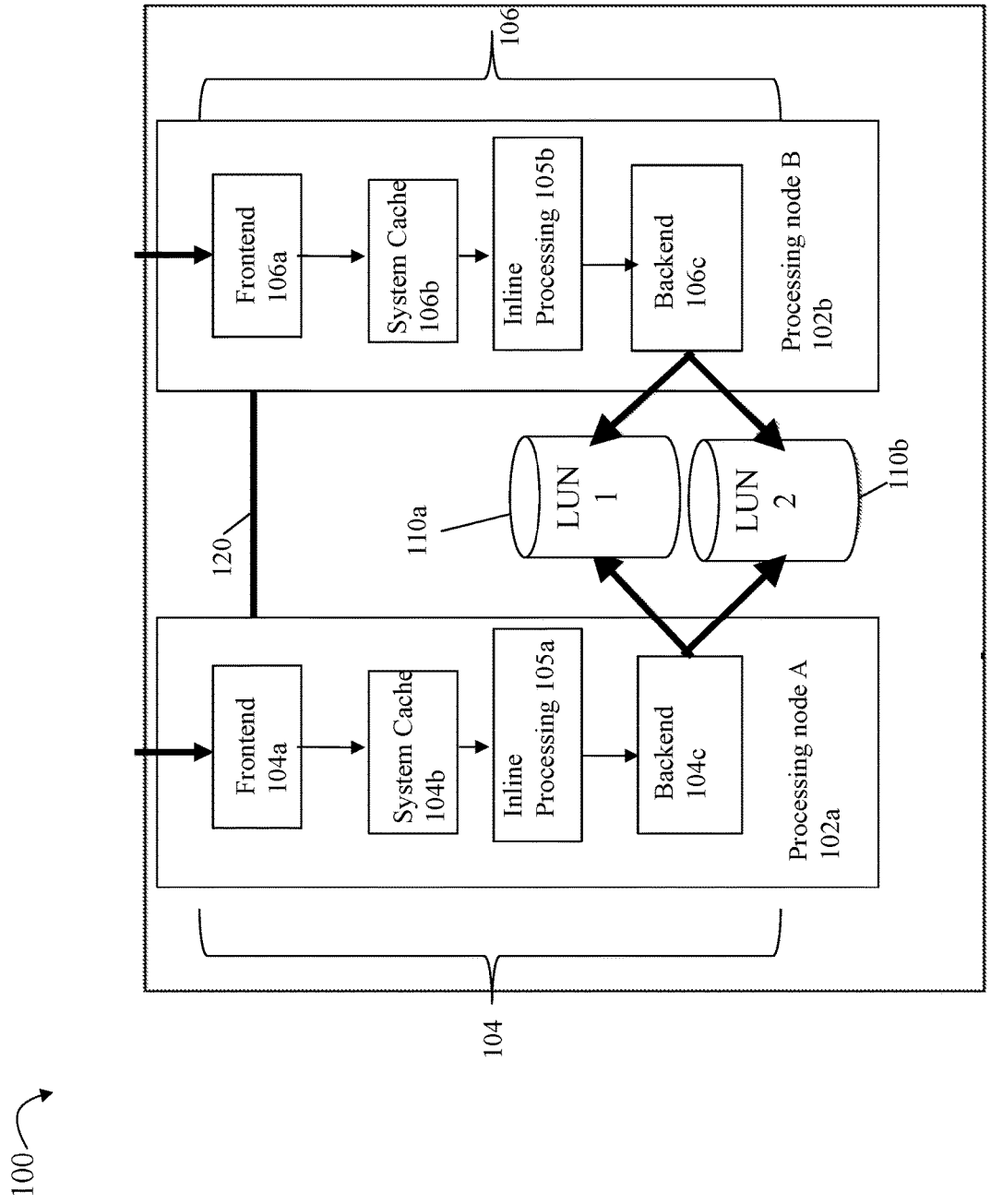
FIG. 2 is an example illustrating the I/O path or data path in connection with processing data in an embodiment in accordance with the techniques of the present disclosure.

With reference to the FIG. 2, shown is an example 100 illustrating components that included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O is be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is referred to herein as an active-active configuration.

In connection with a write operation received from a host, or other external client, and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Thus, in such an embodiment, rather than have dedicated hardware for an FA, DA, and the like, the components described above for the FA, DA, RA, and the like, can be viewed as logical or functional components where the tasks of such components can be implemented by code executed by processors of the nodes as illustrated in FIG. 2. Each node of the pair can include its own resources such as its own local (i.e., used only by the node) resources such as local processor(s), local memory, and the like.

Consistent with other discussion herein, a cache can be used for caching write I/O data and other cached information. The other cached information can include, for example, cached operations or commands such as create snapshot commands. In one system, the cache can be implemented using multiple caching devices or PDs, such as non-volatile (NV) SSDs such as NVRAM devices that are external with respect to both of the nodes or storage controllers. The caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein.

One or more caching devices or PDs can provide a persistent cache sometimes referred to as a data journal, log or log tier used in the data storage system. In such a system, the caching devices or PDs are non-volatile log devices or PDs upon which the log is persistently stored. In at least one embodiment, in addition to such a persistently stored data log, one or more of the nodes can also include node-local in-memory copies of information of the data log. In at least one embodiment, the node-local in-memory copies of information of the data log stored on each node can be stored in volatile memory, such as a RAM, that is local to the node and can be accessed only within the node. For example, a process or thread of code executing on a core or processor of the node can access for reading and/or writing the RAM or other volatile memory that is local to the node.

Consistent with other discussion herein, a data storage system can generally perform many different types of workflows or tasks to provide continuous service. Such workflows or tasks can include synchronous I/O processing tasks, critical background tasks such as asynchronous I/O processing tasks, and different types of maintenance background (BG) tasks. Examples of critical background tasks which are asynchronous I/O processing tasks can include destaging or flushing a data log and/or metadata (MD) log. Examples of maintenance BG tasks can include garbage collection (GC), background deduplication, logical device deletion, snapshot operations, RAID group rebuild operations, and the like. The foregoing tasks or workflows have different levels of importance as well as different constraints and limitations. In existing data storage systems, tasks such as the foregoing can be scheduled for execution according to one or more policies. Such policies should optimally work toward the following goals: minimal I/O latency, maximum I/O bandwidth, full resource utilization, guaranteeing system sustainability, serviceability and general health, and adaptiveness (e.g., ability to adapt to different I/O patterns and changes with respect to the state of the system such as a drive or BE PD failure).

Some existing CPU-based schedulers may be able to regulate and schedule maintenance BG tasks efficiently in a limited set of scenarios when the CPU is generally the only or at least a main system bottleneck. However, consider a scenario where the BE PDs are the bottleneck rather than the CPU. In this case, many threads in the system are waiting for backend completion such as writing to the BE PDs. The CPU may be idle so the scheduler may schedule and execute additional maintenance BG tasks to utilize the idle CPU cycles. However, the additional maintenance BG tasks, such as GC, can create additional pressure and contention for the BE PDs and generally components of the backend of the system so that wait time for I/O requests can further increase. In other words, the additional maintenance BG tasks can further add to the existing bottleneck of the BE PDs since such additional maintenance BG tasks may also utilize resources including one or more of the BE PDs. Clearly without additional maintenance BG task regulation I/O latency can grow uncontrolled.

Maintenance BG task regulation can be characterized as a non-trivial task. On one hand, it is desirable to utilize resources efficiently where, in some existing systems, all the idle CPU cycles can be used for executing maintenance BG tasks. However, excessively performing maintenance BG tasks can have adverse effects, such as lock contention, and can also adversely impact I/O latency even at times when the CPU may not be fully utilized. To avoid adversely impacting I/O latency by having I/O latency become excessive, end-to-end I/O latency can be observed and provided as a feedback for regulating maintenance BG tasks. In such systems, maintenance BG task execution can be reduced or eliminated at various points in time responsive to the I/O latency exceeding a maximum threshold.

One problem with using end-to-end I/O latency to regulate maintenance BG task execution is that such end-to-end I/O latency, without more, may not provide sufficiently precise feedback, since such I/O latency can generally depend on many factors and can increase independent of maintenance BG activity. In many cases in existing systems, maintenance BG task execution can be reduced or eliminated responsive to excessive end-to-end I/O latency even in cases when such reduction does not result in an improvement in I/O latency. Thus, even though I/O latency can be targeted, system resources can be underutilized. For example, consider a scenario where a host issues many I/O requests directed to the same small address range. If a first writer takes a lock on the address range to complete its write, later arriving readers and writers servicing I/O requests to the same address range will have to wait in a line or FIFO (first in first out)-based queue until the lock is released. Once the lock is released, a second writer waiting in the queue can take the lock and further delay additional readers and writers in the queue behind the second writer. In this scenario, the readers and writers requiring the lock can be non-maintenance BG tasks. Thus, I/O latency is increased due to the foregoing lock contention but not mainly or primarily due to maintenance BG task execution. In an existing system using end-to-end I/O latency, responsive to such I/O latency being excessive, maintenance BG task execution may not be scheduled and thus not execute in efforts to reduce the latency. In this scenario, increasing the priority of I/O processing relative to maintenance BG task execution does not result in reducing I/O latency since maintenance BG task execution is not the cause of the bottleneck. However, the foregoing scenario does tend to starve out maintenance BG task execution. In scenarios like the foregoing, it is not uncommon for a system to have a considerable amount of system resources go unutilized or underutilized even though the I/O latency is high.

To overcome the above-noted drawbacks, such as resource underutilization, and provide improved control and regulation of maintenance BG task scheduling and execution, described in the following paragraphs are techniques that regulate the scheduling and execution of maintenance BG tasks using instrumented waiting points (WPs). Such WPs can be instrumented to provide feedback, such as in the form of one or more metrics or statistics, which can be used to regulate and vary the level of maintenance BG task execution and activity in the system. In at least one embodiment, a WP can generally be any workflow or processing point during task execution where an executing thread, process, or other code entity may be waiting for at least one resource or object such as, for example, access to a BE PD, waiting to acquire a lock, waiting for a free entry in the data log or MD log, and the like.

In at least one embodiment in accordance with the techniques of the present disclosure, each individual WP can provide the following feedback: I/O flow waiting time or latency associated with the WP (e.g., WP waiting time or WP I/O waiting time); overall request bandwidth or rate of the WP; and a metric, such as a percentage or a count, denoting the portion or share of the overall requests of the WP which are maintenance BG task requests for the WP. For example, the WP waiting time can denote an average amount of time a thread waits for a resource or object at the WP; the overall request bandwidth or rate can be 100 requests per second (e.g., or other unit of time); and a percentage can denote the portion or share of the overall requests of the WP which are maintenance BG requests for the WP. For example, the percentage can be 10% indicating the share, portion or contribution of maintenance BG tasks with respect to all task requests received at the WP is 10 requests per second (e.g., 10% of 100, where 100 denotes the overall request rate of the WP). In this manner, the percentage can denote a weighting, significance or contribution of maintenance BG tasks with respect to the overall WP request rate as well as with respect to the observed WP's I/O wait time.

In at least one embodiment, a maintenance BG regulator can be a process which regulates, controls and can vary the activity level of maintenance BG tasks. The maintenance BG regulator can monitor and receive feedback from the instrumented WPs of the system. In at least one embodiment, the maintenance BG regulator can determine when the following criteria evaluates to true for at least one WP: the WP I/O waiting time exceeds a waiting time threshold associated with the particular WP; and the percentage or share of the overall requests of the WP which are maintenance BG requests for the WP exceeds a minimum threshold, such as a minimum percentage. If the foregoing criteria for any one or more WP evaluates to true, the maintenance BG regulator can reduce the activity level of maintenance BG tasks.

In at least one embodiment, at least some of the WPs can be instrumented to provide feedback to the maintenance BG regulator.

In at least one embodiment, tasks which can pass through or include processing resulting in traversal of one or more of the instrumented WPs can be classified into multiple classes. The classes can include 3 classes with associated relative priorities. The classes can include: latency critical tasks (LCTs) which can include synchronous I/O processing tasks such as I/O request tasks for receiving and responding to I/O requests; critical background tasks or bandwidth critical tasks (BCTs) such as asynchronous I/O processing tasks which can include background I/O tasks for storing logged write data and metadata associated with write I/O requests on back-end persistent storage in suitable storage structures; and maintenance BG tasks. The foregoing 3 classes can have an associated relative priority, from highest to lowest of: a first class of LCTs; a second class of BCTs; and a third class of maintenance BG tasks. In at least one embodiment, at least some of the WPs can perform prioritization of requests which arrive at, and pass through, the WPs, where such prioritization can be in accordance with the above-noted relative priorities of tasks. Additionally, a WP can also prioritize requests from associated tasks for processing in accordance with quotas or shares associated with the priorities. Each of the quotas associated with a corresponding priority can denote a share of resource usage or consumption in a defined cycle time for the tasks or threads of the corresponding priority. For example, during a specified CPU execution cycle time (or more generally resource usage cycle time), requests from tasks of the first class can have a first quota of denoting first amount of execution time; requests from the second class can have a second quota denoting a second amount of execution time; and requests from the third class can have a third quota denoting a third amount of execution time. In at least one embodiment, the third amount of execution time for maintenance BG tasks can be zero whereby the quotas or shares of the first and second classes of tasks can collectively account for 100% of a scheduling cycle. The quota or share of a class can denote amount of access or an amount of resource usage time within a scheduling cycle allocated to the class, and the priority sets an order in which the class can use its quota or share, with higher priority classes getting access to utilize their associated share or quota prior to lower priority classes. In at least one embodiment, tasks or requests of the third class can be run when both the first and second classes have no tasks ready to run. In at least one embodiment, tasks of the first class can run in a scheduling cycle before any other class so long as the first quota or share of the cycle has not been consumed.

The foregoing and other aspects of the techniques of the present disclosure are described in more detail in the following paragraphs.

As noted above, one problem with using end-to-end I/O latency to regulate maintenance BG task execution is that such end-to-end I/O latency may not provide sufficiently precise feedback, since such I/O latency can generally depend on many factors and can independent of maintenance BG activity. In systems not using the techniques of the present disclosure such as where only I/O latency is used to regulate maintenance BG task activity, such feedback using only end-to-end I/O latency does not allow for distinguishing between cases where the excessive latency is due to high maintenance BG task activity (and so reducing the maintenance BG task activity can result in reducing latency) and where the excessive latency is not due to high maintenance BG task activity (where reducing the maintenance BG task activity generally does not result in reducing latency). In contrast, an embodiment in accordance with the techniques of the present disclosure utilizes additional feedback from instrumented WPs to distinguish or differentiate between the foregoing cases and determine when reducing the maintenance BG task activity is expected to reduce the I/O latency and when reducing the maintenance BG task activity is not expected to reduce I/O latency. Additionally, use of such additional feedback from the instrumented WPs in accordance with the techniques of the present disclosure can further provide for more efficient resource utilization.

In a data storage system, minimizing the latency of I/O requests is a critical performance metric. In at least one data storage system using the dual node architecture such as described in connection with FIG. 2, for write operations, latency is determined by the amount of time taken to store the write data in the data log where the write data is visible to both nodes or controllers of the system.

Consistent with other discussion herein, the data log can be used to optimize write I/O operation latency. Generally, the write I/O operation writing data is received by the data storage system from a host or other client. The data storage system then performs processing to persistently record the write operation in the data log. Once the write operation is persistently recorded in the data log, the data storage system can send an acknowledgement to the client regarding successful completion of the write operation. At some point in time subsequent to logging the write operation the data log, the write operation is flushed or destaged from the data log to the BE PDs. In connection with flushing the recorded write operation and write data from the data log, the data written by the write operation is stored on non-volatile physical storage of a back-end (BE) PD or long term persistent storage. The space of the data log used to record the write operation that has been flushed can now be reclaimed for reuse. The write operation can be recorded in the data log in any suitable manner and can include, for example, recording a target logical address to which the write operation is directed and recording the write data written to the target logical address by the write operation.

In the data log in at least one embodiment, each logged operation can be recorded in the next logically sequential record of the log. For example, a logged write I/O and write data (e.g., write I/O payload) can be recorded in a next logically sequential record of the log. The data log can be logically circular in nature in that once a write operation is recorded in the last record of the data log, recording of the next write proceeds with recording in the first record of the data log.

In at least one embodiment, a metadata (MD) log can be used to temporarily store MD changes that can accompany write of data as recorded in the data log. For example, writing new data can include writing the user data itself and writing MD stored in the MD log, where the MD can be used to generally map the recorded write data of a write operation (as stored in a record of the data log) to a physical storage location on a BE PD of the storage system.

In at least one embodiment, a portion of volatile memory can be used as a form of cache for caching user or client data of I/O operations. For example, in at least one embodiment, read data used for servicing read I/Os can be stored in a volatile memory cache.

Although non-volatile memory can be used for the data log and MD log and volatile memory can be used for caching read and/or write data, use of the foregoing are not required and other forms of media can be used in an embodiment.

Consistent with other discussion herein in connection with FIGS. 1 and 2, a host can issue I/O requests to a data storage system. An SP of the data storage system receives the I/O requests and initiates further processing. The I/O requests can include read and write I/O operations. Read requests or read I/O operations include requests to read specified regions of specified data objects, such as a LUN and/or file system. Read requests can be serviced from cache, such as a volatile memory cache, which may hold the data requested. In the event of a read cache miss, the SP can fetch the requested data from persistent storage, such as a BE PD, where the read data can be stored in the cache and then returned to the requesting host. In either case of a read cache miss or hit, the requested read data can be returned to the requesting host in a read response. Latency of the read request or I/O operation can be measured as the time between arrival of the read request or read I/O operation and return of the response which includes the requested data. Tasks associated with receiving the read requests and obtaining the requested data can be characterized as latency-critical tasks (LCTs).

As for writes, write requests or I/O operations specify data to be written to persistent storage structures, such as a LUN and/or file system, hosted by the data storage system. Processing of write requests or I/O operations can include temporarily storing the data being written in the data log. Once the data of a write request or I/O operations has been successfully persisted to the data log, an acknowledgement can be returned to the requesting host that originated the write request. Upon returning the acknowledgement to the host from the data storage system, the host can consider the write request or I/O operation as completed. Latency of a write request can be measured as the time between arrival of the write request or I/O operation and return of the acknowledgement to the host or other client which originated the write request. Tasks associated with receiving write requests, persisting the specified write data in the data log, and issuing acknowledgements can also be considered LCTs. Additionally, although write requests or I/O operation can be deemed complete for latency purposes upon issuance of acknowledgements to the originating host or other client, additional tasks are needed before the writes can be fully incorporated into the persistent structures (e.g., LUN and/or file system). Such additional tasks associated with write requests or I/O operations in at least one embodiment can include, for example, flushing the persisted data in the data log to lower processing levels in the storage system, with the data eventually being persistently stored on BE PDs. As an example, flushing from the data log can include performing inline processing, such as inline deduplication and/or inline compression as discussed above such as in connection with FIG. 2. Also, MD changes that accompany the data writes can be stored in the MD log, and such MD changes can also be flushed to persistent structures on BE PDs. Although the tasks associated with flushing from the data log and MD log as well as performing inline processing are not latency-critical, they can nonetheless be characterized as bandwidth-critical tasks or background critical tasks (BCTs) given that a failure of the SP to keep up with these BCT activities can result in severe consequences. For example, if the data log becomes full, it loses the ability to accept any new data, causing the data storage system to deny all write requests until it can create new space in the data log (e.g., by flushing accumulated data such that the space occupied by the data becomes free). Such a log-full condition causes latency to jump to an unacceptable level and should be avoided. Thus, tasks performed by the SP can include LCTs, e.g., for generally synchronous activities that require the fastest responses, and BCTs, e.g., for generally asynchronous activities that complete the activities started by the synchronous activities. Not all activities in a data storage system are LCTs or BCTs. Some additional types of activities can be more properly characterized as background (BG) maintenance tasks (BMTs). For example, BMTs can include tasks that are not immediately urgent, such as garbage collection (GC), background deduplication (DD), background compression, and relocation of data.

A scheduling cycle can be specified as a defined amount of time such as, for example, 500 microseconds. In at least one embodiment, maintenance BG tasks can be scheduled to run during a scheduling cycle based on a residual principle. In other words in such an embodiment, maintenance BG tasks can be scheduled to run when the CPU is idle in that there are no other tasks of other higher priority classes ready to run. More generally in connection with a resource, maintenance BG tasks can be scheduled to use the resource when the resource is otherwise idle in that there are no other tasks of higher priority classes ready to run and use the resource.

Generally, I/O latency with respect to an I/O operation, such as a read or write operation, can consist of the following 3 components: run time, waiting time, and ready-waiting time. Run time is the amount of execution time (e.g., CPU execution time) to perform the operation. Runtime is generally relatively small compared to, for example, waiting time, and is relatively constant and predictable. Waiting time can be characterized as the amount of time waiting for any type of resource in connection with the one or more resources or objects needed to perform or service the I/O operation. Waiting time can include the amount of time waiting to acquire a necessary resource such as, for example, a hardware resource such as a BE PD, NVRAM, volatile memory cache location, locks, and the like. Waiting time is typically much higher than run time and can be unpredictable due to its dependency on a varying workload and many other factors. Ready-waiting time is the amount of time an I/O thread is waiting for scheduling where the thread is waiting to be executed and waiting for the CPU resource. Thus, the main contributor of end-to-end latency is waiting time, and in at least one embodiment in accordance with the techniques of the present disclosure, processing can monitor and control end-to-end latency by monitoring and controlling I/O thread waiting time.

The techniques of the present disclosure use feedback from WPs for maintenance BG regulation rather than end-to-end-latency. A WP can be any workflow processing point in connection with I/O processing, where the WP is associated with waiting for one or more resources or objects in connection with I/O processing. The resource can be, for example, a BE PD or particular address or location or address range of the BE PD, BE PDs collectively as a resource, cache such as a free cache entry or one or more particular cache entries including data, the MD log such as a free MD log entry, the data log such as a free data log entry, a lock (e.g., where the request is for a process or thread waiting to acquire the lock), a first hardware (HW) component such as a HW component that performs compression and/or decompression so that such compression/decompression processing can be offloaded to processors of the HW component, a second HW component such as a HW component that provides a network interface used for network communications and messaging, and the like.

Figure 3:
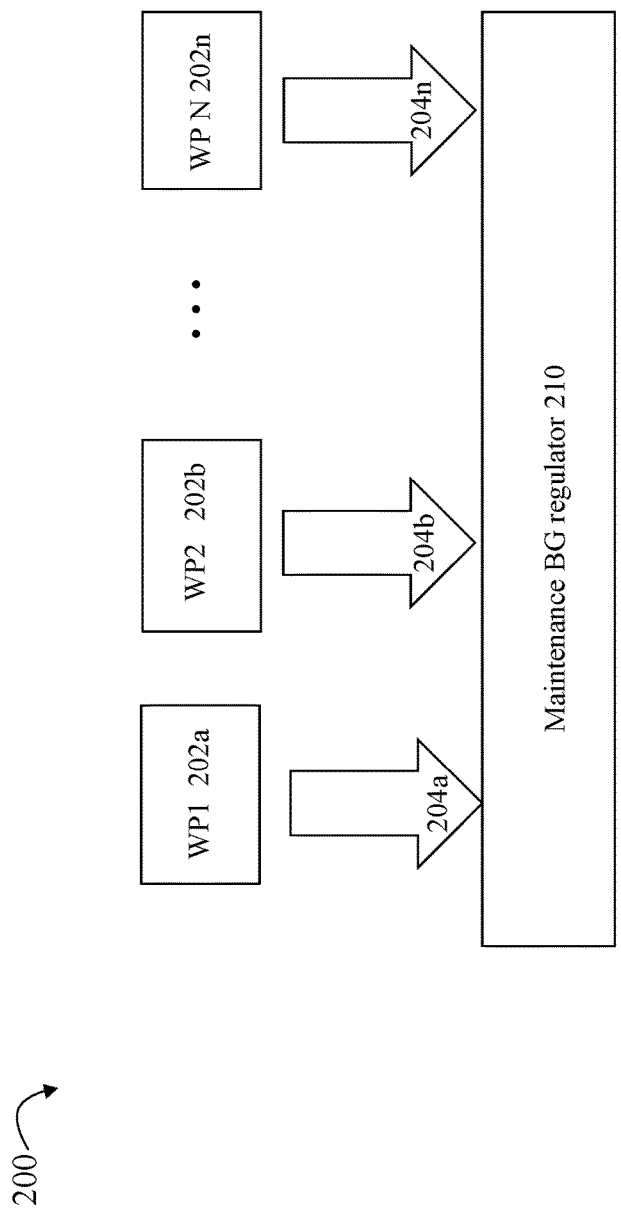
FIG. 3 is an example illustrating instrumented WPs and a maintenance background (BG) regulator in an embodiment in accordance with the techniques of the present disclosure.

Referring to FIG. 3, shown is an example 200 illustrating WPs and a maintenance BG regulator in at least one embodiment in accordance with the techniques of the present disclosure.

The example 200 includes WPs 202a-n denoting N WPs included in I/O workflow processing in connection with servicing I/O operations such as read and/or write operations. Each of the WPs 202a-n can denote an instrumented WP providing one or more metrics, respectively, as feedback 204a-n to the maintenance BG regulator 210. The maintenance BG regulator 210 can be a program, process, routine or other code entity that performs processing described herein to evaluate whether to vary or change the maintenance BG task activity. In at least one embodiment, threads can execute within the data storage system to perform processing to service an I/O operation where each such thread may wait at one or more of the WPs 202a-n for one or more resources or objects. In this manner, each of the WPs 202a-n denotes a waiting point in I/O workflow processing where a thread can wait for one or more resources or objects associated with the particular WP. For example, WP 202a can denote a workflow or processing point where a thread can wait for 3 different resources or objects; and WP 202b can denote a workflow or processing point where a thread can wait for 1 resource or object. In a similar manner, each of the remaining N WPs can denote a workflow or processing point where a thread can wait for any number of resources or objects. In this manner, a thread waiting at a WP can request access to use the one or more resources of objects of the WP. In at least one embodiment, each such request made by a thread or task can be placed on a queue associated with the WP where the request can be selected for servicing by the WP. When a request is selected for servicing by the WP, the thread or task which made the request can generally be granted access to the one or more requested resources. Depending on the resources, the thread or task can utilize the accessed resources of the WP to perform processing for an associated workflow of a particular class.

Figure 4:
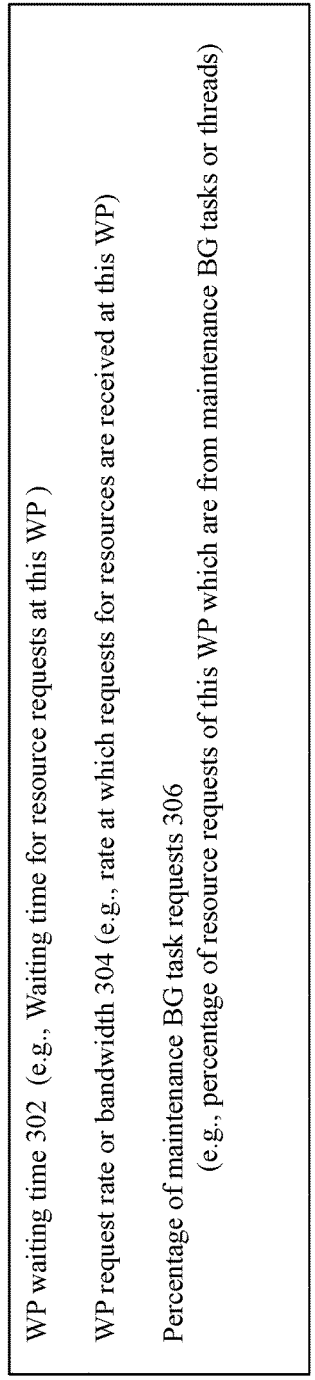
FIG. 4 is an example illustrating feedback metrics that may be collected and used in an embodiment in accordance with the techniques of the present disclosure.

Referring to FIG. 4, shown is an example 300 illustrating metrics that can be provided as feedback by each of the WPs to the maintenance BG regulator in at least one embodiment in accordance with the techniques of the present disclosure.

The example 300 includes the following metrics: WP waiting time 302, WP request rate or bandwidth 304, and percentage of maintenance BG task requests 306. In at least one embodiment, a set of the metrics 300 can be provided, for example, periodically, from each of the WPs to the maintenance BG regulator. In at least one embodiment, the metrics can be determined anew or fresh for each time period or collection period. In this manner, any metric denoting an average, rate or count can be determined with respect to resource requests received at a single WP during a single time period or collection period.

The WP waiting time 302 denotes the waiting time for servicing resource requests at this WP. In at least one embodiment, the WP waiting time 302 can denote the average waiting time for servicing a resource request received at a particular WP. For example, assume that requests for a resource wait in a queue at the WP. A newly received resource request for the resource can be placed in the queue, which can be a FIFO queue, where requests for the resource are serviced as they are removed from the FIFO-based waiting queue. The WP waiting time 302 can denote the average amount of time a request waits in the queue of the WP for the resource (e.g., before being serviced). In at least one embodiment, if an executing thread must acquire and thus can wait for multiple resources at a single WP, the WP waiting time 302 can denote an average waiting time with respect to waiting to acquire all the multiple resources associated with the single WP. If all multiple resources cannot be acquired simultaneously by a next thread waiting for execution at the single WP, the next thread can continue to wait until it is able to acquire all multiple resources needed as associated with the single WP. In at least one embodiment, the WP waiting time 302 can denote the average waiting time with respect to a current time period during which the metrics are gathered periodically and reported to the maintenance BG regulator.

In at least one embodiment, incoming requests received at a single WP can be placed into one of multiple waiting queues, such as one of 3 queues, where each of the queues can be associated with different corresponding one of the task classes or priorities. In such an embodiment with multiple waiting queues at the single WP, the WP waiting time 302 can denote an average waiting time with respect to all multiple wait queues associated with the single WP.

The WP request rate or bandwidth 304 can denote the aggregated or overall rate at which requests for resources are received at this WP. For example, assume that a WP is associated with a single resource and thus a single wait queue of requests waiting for the resource. The WP request rate or bandwidth 304 can thus denote the rate at which new incoming requests arrive at, are added to, or are placed in, the single wait queue. For example, the WP request rate 304 can denote a number of requests per second (or other suitable amount of time). If the single WP is associated with multiple wait queues as noted above and elsewhere herein, the WP request rate 304 can denote the overall, aggregate or total rate at which new requests are received with respect to all such multiple wait queues. For example, if there are 2 wait queues, Q1 and Q2, where Q1 has a WP request rate of 100 requests/second and Q2 has a WP requests rate of 500 requests/second, the collective WP request rate 304 for the single WP is 600 requests/second.

The percentage of maintenance BG task requests 306 can denote a share, portion or percentage of the overall or total resource requests of this WP which are from maintenance BG tasks or threads. For example, if the WP request rate 304 is 600 requests/second as noted above, and of those 600 requests, 60 are maintenance BG requests, then the percentage of maintenance BG task requests 306 is 10%. It should be noted that a rate or bandwidth rather than a percentage can be used as the value of the metric 306 to denote the share or portion of the overall resource requests for the WP (e.g., share or portion of the metric 304) which are from maintenance BG tasks or threads (e.g., class 3 BMTs). Subsequently, the maintenance BG regulator may calculate the percentage of maintenance BG task requests based on the ratio of 1) the share or portion of requests received at the WP which are from maintenance BG tasks or threads, with respect to 2) the overall aggregate or total number of requests received at the WP. In at least one embodiment, the metrics 304 and 306 can both more simply denote counts, where the metric 304 can denote a total count of the number of requests arriving at the WP during a time period or collection period, where the metric 306 can denote a count of the number of requests from maintenance BG tasks arriving at the WP during the time period of collection period, and where the ratio of the metric 304 with respect to the metric 306 can denote the percentage of maintenance BG tasks requests during the time period or collection period.

In at least one embodiment, each request for a resource received at a WP can be tagged with a task or flow attribute denoting the particular class of the task or thread making the resource request. In at least one embodiment, tasks can be partitioned into a number of classes such as the 3 classes described herein of: class 1 (C1)=LCTs; class 2 (C2)=BCTs; and class 3 (C3)=BMTs. In this manner, resource requests from tasks, and threads performing such tasks, can be tagged with an attribute denoting one of the foregoing 3 classes thereby identifying the class of the task or thread making the resource request. In at least one embodiment where a WP has a different waiting queue for each class, the WP can have 3 waiting queues for the above-noted 3 classes. In such an embodiment, each new incoming resource request received by the WP can have an associated attribute denoting the class of the request, and where the incoming request can then be placed on the particular one of the 3 waiting queues corresponding to the class attribute of the request.

In at least one embodiment, the maintenance BG regulator can be a process which regulates, controls and can vary the activity level of maintenance BG tasks. The maintenance BG regulator can monitor and receive feedback, such as the metrics 300 of FIG. 4, received from the instrumented WPs of the system. In at least one embodiment, the maintenance BG regulator can determine when the following criteria evaluates to true for at least one WP: the WP waiting time 302 exceeds a waiting time threshold associated with the particular WP; and the percentage 306 or share of the overall requests of the WP which are maintenance BG requests for the WP exceeds a minimum threshold, such as a minimum percentage. If the foregoing criteria for a WP evaluates to true, the maintenance BG regulator can reduce the activity level of maintenance BG tasks.

In at least one embodiment, the waiting time threshold denoting a maximum WP waiting time can be specified for each WP. In this manner, the waiting time threshold used in the criteria can be customized for, and can vary with, each WP as well as the one or more resources of each particular WP.

In at least one embodiment, the minimum threshold can be specified for each WP. In this manner, the minimum threshold used the criteria can be customized for, and can vary with, each WP as well as the one or more resources of each particular WP.

The set of the metrics 300 can be used to provide an understanding, with respect to a single WP, when the waiting time of the single WP exceeds the maximum WP waiting time for the single WP, and whether maintenance BG task requests activity at the single WP impacts the WP wait time of the single WP (e.g., whether WP waiting time, and thus I/O latency, will be reduced by reducing or eliminating maintenance BG requests for resources). As noted above, the criteria includes determining whether the percentage 306 or share of the overall requests of the WP which are maintenance BG requests for the WP exceeds a minimum threshold, such as a minimum percentage. If the percentage 306 does not exceed the minimum threshold, then it can be determined that reducing the maintenance BG activity for the particular single WP is not expected to reduce I/O latency. Alternatively, if the percentage 306 or share of the overall requests of the WP which are maintenance BG requests for the WP exceeds the minimum threshold, such as the minimum percentage, it can be determined that reducing the maintenance BG activity for the particular single WP is expected to also impact and reduce I/O latency.

In at least one embodiment, for a HW resource (e.g., a drive or PD, or a HW component such as a dedicated HW device that performs compression and/or decompression) processing can determine the expected resulting I/O latency for the HW resource if there is a reduction in IOPs (I/Os per second or I/O rate) by a specified number of requests (e.g., denoting the amount of reduction in IOPS), and where such requests are generated by the maintenance BG tasks or threads (e.g., where the reduction in requests denotes a reduction in the number of task or class 3 requests). Generally, for particular PDs and other HW components, performance curves can be used which describe I/O latency as a function of IOPs, a request rate or bandwidth. Thus, if IOPs or requests are reduced for a particular PD or other HW resource, its associated performance curve can be used to determine the expected reduced I/O latency for I/Os directed to the particular PD or other HW resource.

In this manner, the metrics 300 can be used to describe and characterize the maintenance BG activity at each particular WP.

Figure 5:
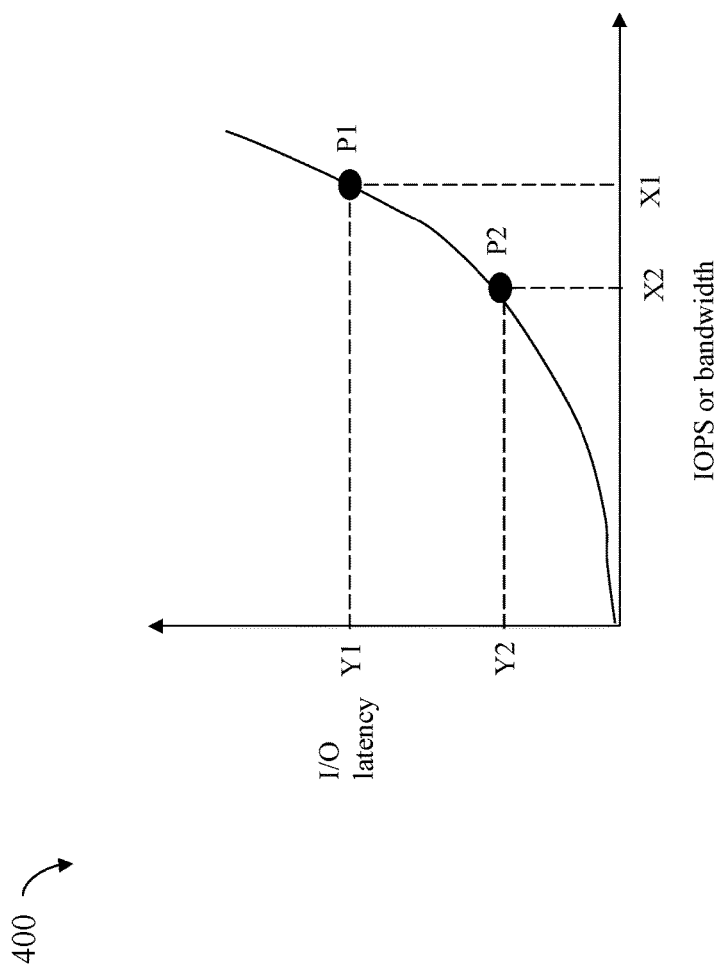
FIG. 5 is an example of a performance curve that may be used in an embodiment in accordance with the techniques of the present disclosure.

To further illustrate use of a performance characteristic curve with a HW device such as a BE PD, reference is made to the example 400 of FIG. 5. The example 400 includes a performance curve with IOPS or bandwidth on the X axis and I/O latency on the Y axis. The curve of the example 400 can be determined for a HW device such as a BE PD through testing and can be included in technical specifications provided by a manufacturer or other supplier of the particular BE PD. In accordance with the techniques of the present disclosure, assume that point P1=(X1, Y1), where X1 denotes a current rate of IOPS and Y1 denotes a resulting current I/O latency. Reducing the IOPS rate from X1 to X2 results in also achieving a corresponding reduction in I/O latency based on the curve as denoted by Y2. In this manner in at least one embodiment, a performance curve such as illustrated in FIG. 5 characterizing a particular HW device can be used to more specifically calculate the expected resulting I/O latency if the IOPS rate is reduced by a particular amount, where the amount denotes a number of resource requests generated by maintenance BG tasks or threads (e.g., class 3 resource requests).

Thus, the foregoing WP feedback, such as the metrics of FIG. 4, can be used to describe or characterize the impact of the maintenance BG activity at each particular WP and can be used by the maintenance BG regulator 210 of FIG. 3 in evaluating and making a corresponding regulation decision regarding maintenance BG activity in the system at various points in time.

In at least one embodiment, the maintenance BG regulator 210 of FIG. 3 can schedule and control the running or execution of maintenance BG tasks, or threads thereof. More generally in at least one embodiment, the maintenance BG regulator 210 of FIG. 3 can schedule and control the activity level or utilization level of maintenance BG tasks, or threads thereof with respect to a resource, where the CPU is one such resource, and where the resource can generally be any suitable resource in a system.

Figure 6:
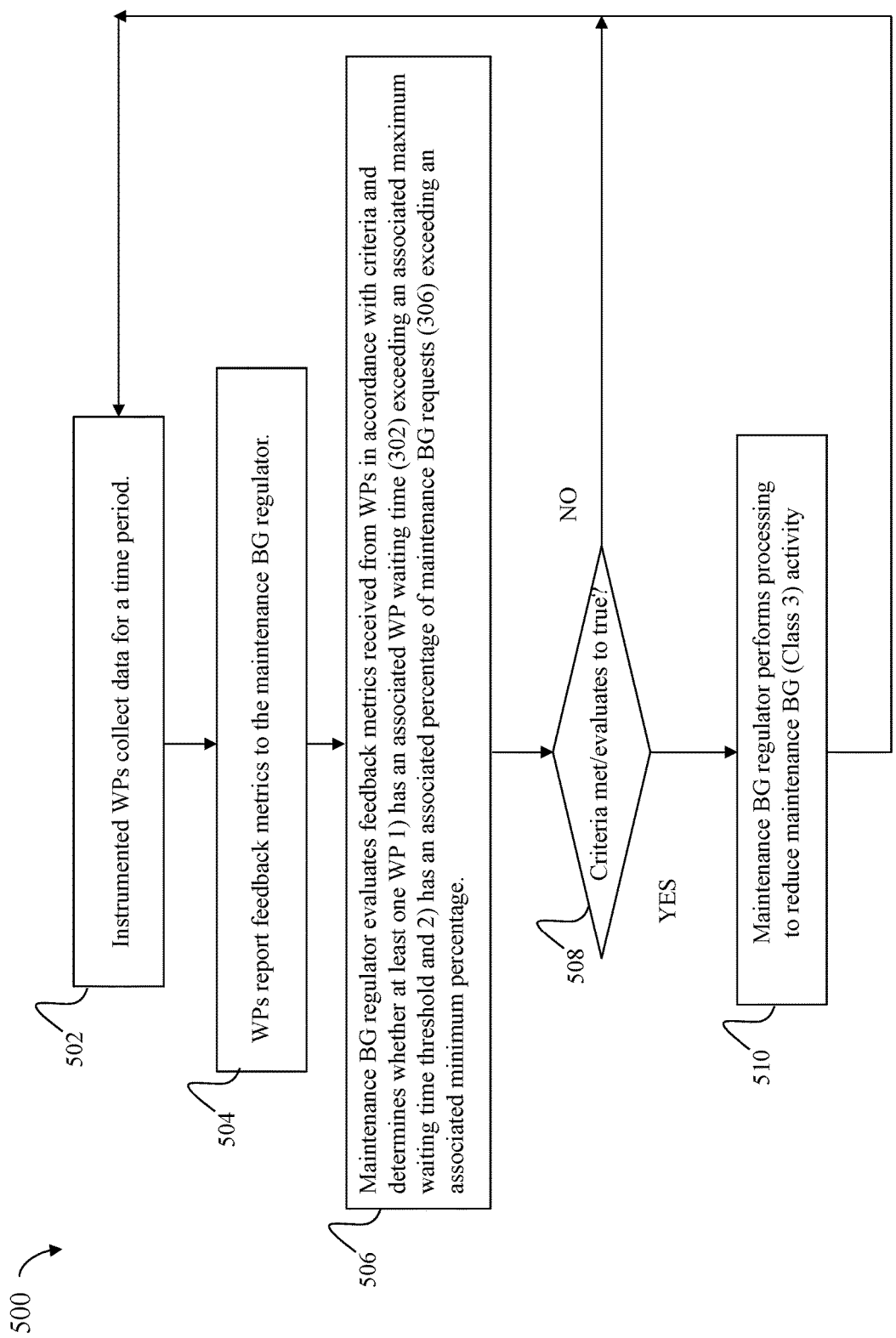
FIGS. 6 and 8B are flowcharts of processing steps that can be performed in an embodiment in accordance with the techniques of the present disclosure.

Referring to FIG. 6, shown is a flowchart 500 of processing that can be performed in at least one embodiment in accordance with the techniques of the present disclosure. The flowchart 500 summarizes processing discussed above.

At the step 502, instrumented WPs collect data for the set of metrics for a time period. The metrics may be those as described in connection with FIG. 4. In at least one embodiment prior to beginning collecting the metrics for the next time period, the step 502 can include initializing the various metrics prior to collecting information for the next time period. From the step 502, control proceeds to the step 504.

At the step 504, the WPs report their respective feedback metrics to the maintenance BG regulator. From the step 504, control proceeds to the step 506.

At the step 506, the maintenance BG regulator evaluates the feedback metrics received from the WPs in accordance with criteria and determines whether the reported metrics from at least one WP meets the criteria such that the criteria evaluates to true. The criteria can include determining whether at least one WP 1) has an associated WP waiting time (302) exceeding an associated maximum waiting time threshold, and 2) has an associated percentage of maintenance BG requests (306) exceeding an associated minimum percentage. From the step 506, control proceeds to the step 508.

At the step 508, the maintenance BG regulator can determine whether the criteria is met or evaluates to true for at least one WP. If the step 508 evaluates to no, control proceeds to the step 502. Otherwise, if the step 508 evaluates to yes, control proceeds to the step 510.

At the step 510, the maintenance BG regulator performs processing to reduce maintenance BG task activity associated with class 3 tasks. The maintenance BG regulator may reduce maintenance BG task activity in any suitable manner.

For example, the maintenance BG regulator can control the creation or generation of new maintenance BG tasks or threads which are then scheduled to run by the CPU scheduler. On one level to reduce maintenance BG task activity, the maintenance BG regulator can reduce, pause or stop generating such new maintenance BG tasks or threads such as for a specified amount of time. In this manner, no new maintenance BG tasks may be created (for scheduling and execution) for the specified amount of time, or a reduced number of such new maintenance BG tasks may be commenced for scheduling and execution for the specified amount of time. In at least one embodiment, the maintenance BG regulator can automatically resume or increase generating new maintenance BG threads for scheduling and execution once the specified amount of time has expired. As a variation in at least one embodiment, the maintenance BG regulator can resume or increase generating new maintenance BG threads for scheduling and execution once the maintenance BG regulator determines that the criteria described above evaluates to false for all WPs. On a second level, there may be existing maintenance BG tasks or threads which are queued and ready waiting to be run by the CPU scheduler. Such existing maintenance BG tasks or threads may have already been run or executed for a first amount of time but may not have completed execution and are therefore waiting to be run by the CPU scheduler. Another way in which the maintenance BG regulator can reduce maintenance BG activity is by signaling or communicating with the CPU scheduler not to dequeue any such maintenance BG threads which are ready and waiting (e.g., in a queue) to execute or run. In this manner, the CPU scheduler can, for example for a defined amount of time, temporarily pause or stop dequeuing maintenance BG threads which are ready and waiting to execute or run. At a later point in time, the CPU scheduler can resume dequeuing maintenance BG threads for execution where such maintenance BG threads are ready and waiting to execute or run. In at least one embodiment, the CPU scheduler can resume dequeuing and scheduling the execution of maintenance BG tasks which are ready to run automatically after a specified amount of time has passed. As a variation in at least one embodiment, the CPU scheduler can resume dequeuing and scheduling the execution of maintenance BG tasks which are ready to run responsive to notification from the maintenance BG regulator. For example, the maintenance BG regulator can notify or instruct the CPU scheduler to resume the foregoing dequeuing and scheduling of ready to run maintenance BG threads once the maintenance BG regulator determines that the criteria described above evaluates to false for all WPs. From the step 510, control proceeds to the step 502.

Based on the above criteria for each WP, even though the WP waiting time for each WP can be high and exceed an associated threshold, if the percentage, contribution or share of maintenance BG task requests (306) does not exceed a minimum threshold, then the techniques herein do not reduce maintenance BG task activity since such a reduction is not expected to impact or reduce overall I/O latency (which is also high since each WP waiting time is high exceeding its associated threshold).

Based on the foregoing, the techniques of the present disclosure provide a finer granularity for evaluating metrics of each individual WP including the waiting time of each individual WP and the percentage, contribution or share of maintenance BG task requests of each individual WP.

In connection with FIG. 6 processing as described above, the maintenance BG regulator can receive and evaluate the feedback metrics from all instrumented WPs. As a variation, and more generally, different components or entities can evaluate the feedback metrics of the WPs and then notify the maintenance BG regulator in connection with any WP for which the criteria evaluates to true for a set of feedback metrics of the WP. For example, in at least one embodiment, rather than have the WPs report the sets of feedback metrics to the maintenance BG regulator for evaluation in accordance with the criteria of the step 506, each of the WPs can evaluate its own set of feedback metrics using the criteria and can notify the maintenance BG regulator when a WP detects or determines that the criteria evaluates to true for the WP's own set of feedback metrics.

In at least one embodiment in accordance with the techniques of the present disclosure, a list of required resources (LRR) can be used to further refine processing performed by the maintenance BG regulator. In at least one embodiment, the LRR can include a first table of information identifying, for each instrumented WP, the specific one or more resources acquired at each individual WP. In this manner, the LRR can identify the particular one or more resources which are acquired or required at each instrumented WP which reporting sets of the metrics of FIG. 4 to the maintenance BG regulator. Additionally, the LRR can include a second table of information identifying, for each maintenance BG thread or task type, the one or more resources required and used by the maintenance BG thread or task type. In at least one embodiment, the maintenance BG regulator can create or generate new maintenance BG threads for execution each having an associated type, where the type can represent a particular maintenance BG flow or task. For example, a thread T1 can be creating having a first type X1, wherein X1 can denote a particular maintenance BG thread or task type of GC, where T1 of type X1 can perform GC processing and can require use of PD resources which are rotating disk drives but not SSDs. A second thread T2 can be creating having a second type X2, wherein X2 can denote a particular maintenance BG thread or task type of GC, where T2 of type X2 can perform GC processing and can require use of PD resources which are SSD, but not rotating disk drives. A third thread T3 can be created having a third type X99, wherein X99 can denote another particular maintenance BG thread or task type, where T3 of type X99 can require use of a particular HW device D1 that performs offloading processing of compression and decompression, but where the type X99 thread T3 does not use any rotating disk drive or any SSD. The maintenance BG regulator can use the information of the LRR to further refine its processing in connection with regulation and control of the activity of maintenance BG threads of different types. For example, assume WP1 reports feedback metrics indicating it is overloaded in that the criteria described above evaluates to true. In response the maintenance BG regulator can perform processing to reduce the activity level of maintenance BG threads or tasks. In this example, WP1 may only use one resource which is the HW device D1 performing offload processing of compression and decompression and, in particular, may not use any rotating disk drive resources or any SSD resources. As a result, in response to the criteria evaluating to true for WP1, the maintenance BG regulator can continue creating and queuing or scheduling of execution maintenance BG thread types which do not use the HW device D1 but which can use other resources such as rotating disk drives and SSDs. In this example, the maintenance BG regulator may, for example, temporarily stop creating and scheduling for execution maintenance BG threads of type X99 but may continue to create and schedule for execution new instances of maintenance BG threads of the types X1 and X2. Thus, in at least one embodiment, the maintenance BG regulator can selectively continue to allow maintenance BG threads to execute which use or require resources which are not also required by the overloaded WP1 for which the criteria evaluates to true.

Figure 7:
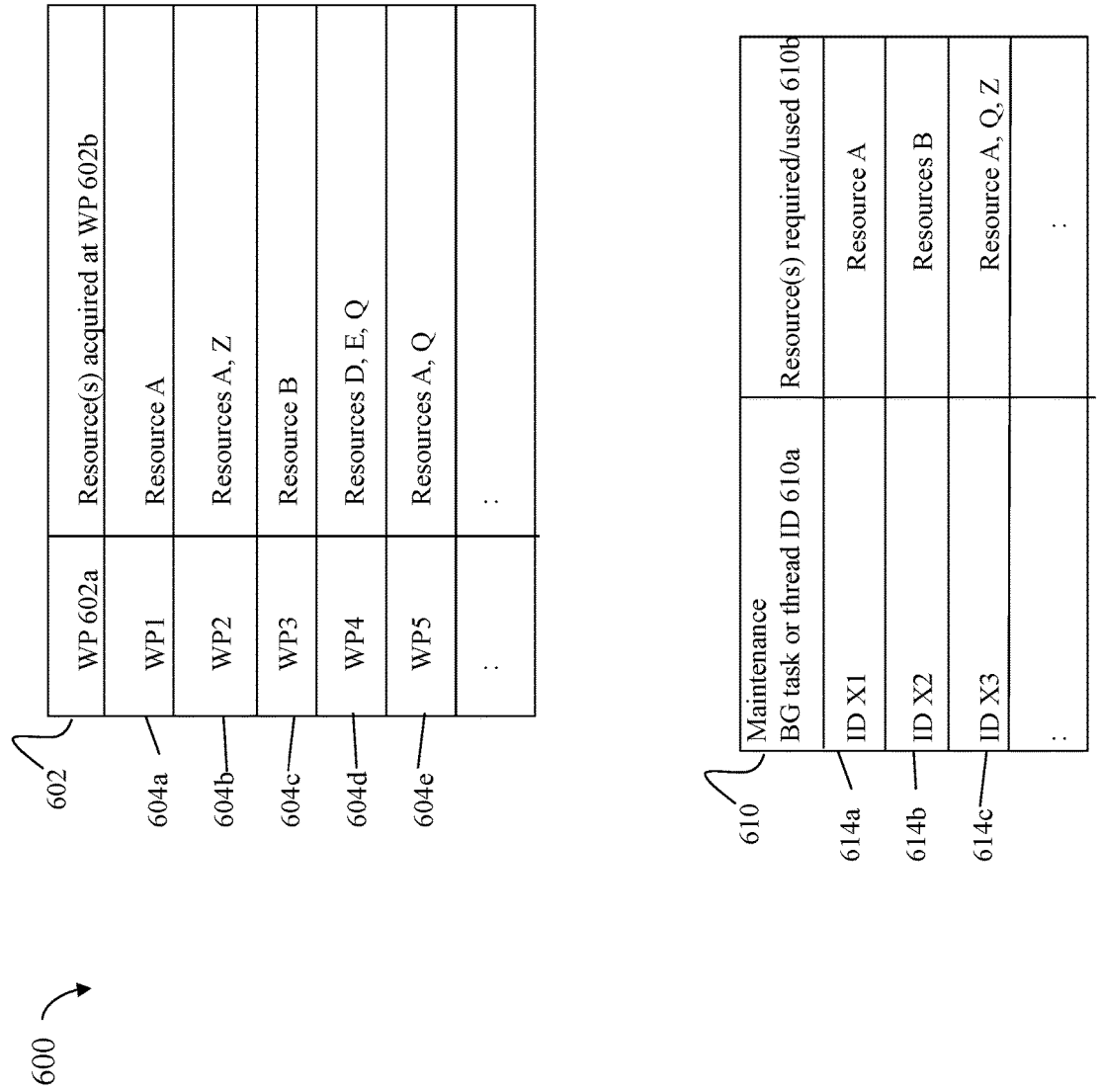
FIG. 7 is an example of tables of resources associated with waiting points (WPs) and different types of maintenance BG tasks, where such tables can be used in an embodiment in accordance with the techniques of the present disclosure.

Referring to FIG. 7, shown is an example 600 of information that can be included in tables of the LRR in at least one embodiment in accordance with the techniques of the present disclosure.

The example 600 includes the first table 602 of information regarding resources acquired at each WP. The table 602 includes a first column 602a denoting the WPs which are instrumented and report to the maintenance BG regulator, and includes a second column 602b denoting the one or more resources acquired at each WP. Each row of the table 602 identifies, for a single WP (column 602a), the one or more resources (602b) acquired at the single WP. The row 604a indicates that a thread for which WP1 is a workflow processing point acquires the resource A at WP1. The row 604b indicates that a thread for which WP2 is a workflow processing point acquires the resources A and Z at WP2. The row 604c indicates that a thread for which WP3 is a workflow processing point acquires the resource B at WP3. The row 604d indicates that a thread for which WP4 is a workflow processing point acquires the resources D, E and Q at WPL. The row 604e indicates that a thread for which WP5 is a workflow processing point acquires the resources A and Q at WP5.

The example 600 includes the second table 610 of information regarding resources required or used by different types of maintenance BF tasks or threads. The table 610 includes a first column 610a denoting the maintenance BG task or thread type, and includes a second column 610b denoting the one or more resources used or required for each task or thread type. Each row of the table 610 identifies, for a single task type (column 610a), the one or more resources (610b) used or required by the corresponding task type. The row 614a indicates that a thread of type X1 requires or uses the resource A. The row 614b indicates that a thread of type X2 requires or uses the resource B. The row 614c indicates that a thread of type X3 requires or uses the resources A, Q and Z.

Assume, for example, the maintenance BG regulator receives a set of metrics S1 as in FIG. 4 from WP4 which acquires resources D, E and Q, and where the BG regulator determines from S1 that WP4 is overloaded since the criteria described above (e.g., step 506 of FIG. 6) using values of S1 evaluates to true. As a result, in response to the criteria evaluating to true for WP4, the maintenance BG regulator can continue creating and queuing or scheduling of execution maintenance BG thread types which do not use any of the resources D, E and Q as identified by the row 604d of the table 602. In this example, the maintenance BG regulator may, for example, temporarily stop creating and scheduling for execution maintenance BG threads which use any one or more of the resources D, E and Q, but may continue to create and schedule for execution new instances of maintenance BG threads of types which do not use any of the resources D, E and Q. For example, the maintenance BG regulator may continue to create and schedule for execution new instances of maintenance BG threads of the types X1 and X2 since, as represented by the rows 614a-b of the table 610, threads of the types X1 and X2 respectively use only resources A and B, and do not use any one or more of the resources D, E and Q. However, the maintenance BG regulator may stop (e.g., temporarily) creating and scheduling for execution new instances of maintenance BG threads of the type X3 since, as denoted by the row 614c, threads of type X3 require or use resource Q which is also required or acquired by the overloaded WP4.

In at least one embodiment, all WPs in associated I/O flows or processing can be instrumented and provide feedback to the maintenance BG regulator. As a variation, an embodiment can have less than all WPs in the associated I/O flows or processing instrumented and provide feedback to the maintenance BG regulator. In some embodiments, a subset of WPs can be selected for instrumentation where such WPs in the subset can have, or be expected to have, large WP waiting times. For example, in at least one embodiment, an instrumented WP may not be implemented in connection with access to the NVRAM (non-volatile random access memory) resource. However, in such an embodiment, instrumented WPs can be implemented in connection with accessing backend resources such as the BE PDs which can include rotating disk drives and/or non-volatile SSDs such as flash-based PDs.

In at least one embodiment, the instrumented WPs can each be implemented as one of multiple supported WP types. In at least one embodiment, 3 different WP types can be supported although an embodiment can generally implement each WP using other suitable types than as described herein. Consistent with other discussion herein, each WP denotes a workflow processing point where I/O flow processing waits to access and/or acquire use of one or more resources. Thus, in one aspect, each WP can denote an access workflow processing point where an executing task or thread needs to acquire access and use of one or more resources. The CPU is one such resource. More generally, the resources or objects acquired or accessed at a WP can include any system resource including, for example, a CPU, a HW device such as a HW component that performs offload compression and/or decompression processing, an SSD, a hard disk drive or rotating disk drive, a lock (e.g., such as used for synchronization access of a resource between multiple users such as between readers and/or writers), and the like. Each WP can be implemented using a particular WP type supported in an embodiment. Described below are 3 different WP types that can be supported in at least one embodiment where, in such an embodiment, each WP can be implemented as one of the 3 WP types described below.

Figure 8A:
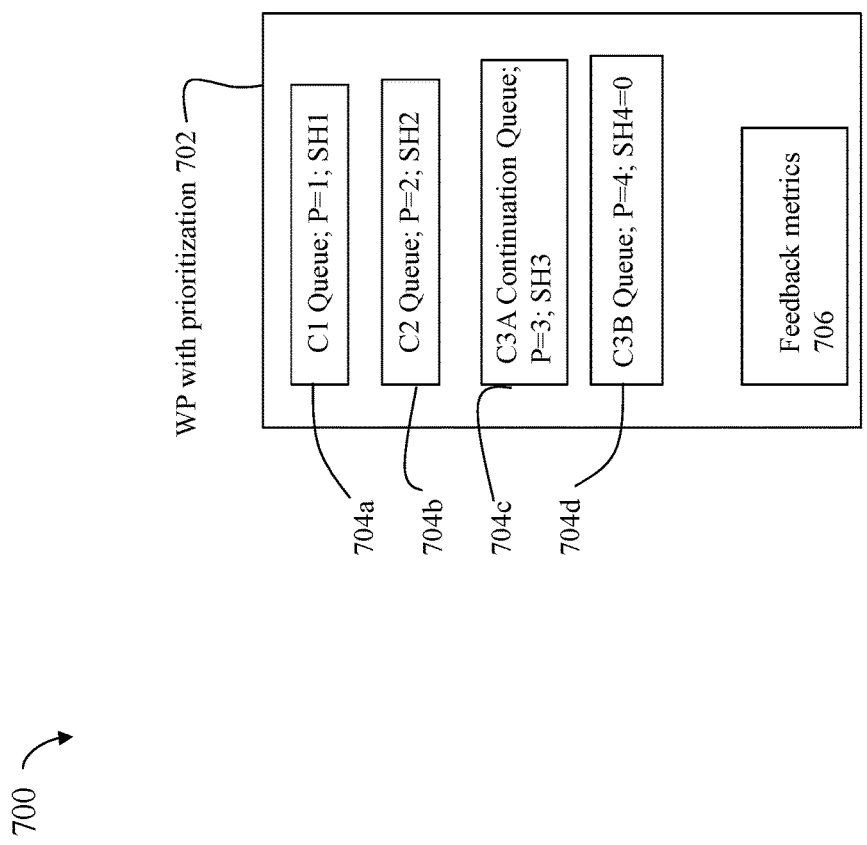
FIGS. 8A, 9 and 10 are examples illustrating different types of WPs which can be implemented in at least one embodiment in accordance with the techniques of the present disclosure.

Referring to FIG. 8A, shown is an example 700 illustrating a first type of WP, WP_type1, implemented with prioritization in at least one embodiment in accordance with the techniques of the present disclosure.

The WP 702 of the type WP_type1 can implement prioritization and schedule usage of the one or more resources associated with the WP based on a scheduling cycle time in a manner as described herein in connection with CPU cycle time.

The WP 702 can collect the feedback metrics 706 as described elsewhere herein, for example, in connection with FIG. 4. In connection with the prioritization of the WP 702, an executing thread or task can have an associated class and priority. In at least one embodiment consistent with other discussion herein, there can be 3 classes of threads or tasks: class 1 (C1) of LCTs; class 2 (C2) of BCTs; and class 3 (C3) of BMTs. In connection with the example WP 702 of FIG. 8A in at least one embodiment, class C3 can be further partitioned and generally characterized as including 2 subclasses C3A and C3B. C3A can denote those C3 tasks or threads which are in-progress and incomplete and for which processing or servicing has commenced but has been temporarily interrupted or paused. C3B can denote those C3 tasks or threads which are waiting in a queue for servicing at WP 702 but where such servicing has not yet commenced. In one aspect, the WP 702 can be characterized as having an aggregate of 4 classes if C3A and C3B are both considered to denote 2 classes rather than subclasses.

In at least one embodiment based on the above-noted classes and subclasses, the WP 702 can implement prioritization using 4 relative priorities and 4 queues each having an associated quota (e.g., which can be zero in the case of C3B) and an associated priority, as follows, from highest to lowest priority: queue 704a of class 1 (C1) LCTs with priority 1 and quota SH1; queue 704b of class 2 (C2) of BCTs with priority 2 and quota SH2; queue 704c (C3 continuation queue) of C3A BMTs which are in-progress for which servicing has commenced but not completed with priority 3 and quota SH3; and queue 704d (C3 queue) of C3B BMTs which are waiting and for which servicing has not commenced with priority 4 and quota SH4. In at least one embodiment based on a residual principle for C3B or priority 4 tasks or threads in the queue 704d, SH4=0 indicating that, in effect, the C3 queue 704d does not have any associated quota. However, the C3 continuation queue 704c (including C3B BMT tasks which are in-progress) can have a non-zero quota to guarantee that the C3A BMT tasks that have already started will be completed in some predictable time. For discussion purposes in general contexts, each of the queues 704a-d can have an associated priority and quota although a quota, such as for queue 704d, can be zero.

When execution of a task or thread having an associated class of C1, C2, or C3 reaches a workflow processing point that is one of the instrumented WPs of the first type, WP_type1 implementing prioritization, the task or thread can be placed in one of 3 queues 704a, b, d based on the tagged class of C1, C2 or C3 of the incoming task or thread. The WP 702 can include the queue 704a in which incoming tasks or threads of class C1 are placed. The WP 702 can include the queue 704b in which incoming tasks or threads of class C2 are placed. The WP 702 can include the queue 704d in which incoming tasks or threads of class C3 (e.g., C3B) are placed. In one aspect, the incoming task or thread requests the one or more resources associated with the WP 702 where the request for the required associated one or more resources of the WP 702 can be initially placed in the particular one of the queues 704a, b or d selected based on the class of the request or associated incoming task or thread. As discussed elsewhere herein, the queue 704c can include those C3 BMT tasks which are in-progress but not complete. Thus, as discussed below in more detail, new incoming C3 BMT requests (C3B requests) can be initially placed on the queue 704d. If a C3 request is selected from the queue 704d for execution and is interrupted, it can be then placed on the queue 704c. When a waiting request of an associated thread is selected from one of the queues 704a-d for servicing, the request can be serviced by acquiring the one or more resources of the WP for usage and then scheduling execution of the associated thread using the acquired WP resources in accordance with priorities and quotas (e.g., where a quota such as of 704d can be zero) of the queues 704a-d.

Consistent with other discussion herein, the requests of WP 702 can be prioritized according to priority and quota defined for each of the queues 704a-d. Generally, the priority sets the order in which tasks or threads (and resources requests of such tasks or threads) are granted access and use of the one or more resources of the WP 702. Tasks, threads and associated requests with higher priority (lower numbered) classes are generally granted access and use to the resources of WP 702 before tasks, threads and associated requests of lower priority (higher numbered) classes. Each class has an associated quota which defines and amount of resource access time (with respect to the resources of WP 702) guaranteed to be available to the class within a defined resource cycle or resource usage time.

Tasks or threads can be scheduled to have access or usage to the resources of WP 702 in defined resource cycles of usage time. For example, such cycles can be uniform or non-uniform in length. Within each scheduling cycle, C1 tasks (tasks of the highest-priority class) run first, generally until queue 704a is empty or until C1 has consumed its quota SH1. Next, C2 tasks (tasks of the next-highest-priority class) run, generally until queue 704b is empty or until C2 tasks have consumed its quota SH2. Next, C3A tasks (in-progress C3 BMT tasks) run generally until the queue 704c is empty or until C3A tasks have consumed the associated quota SH3. If any time remains in the cycle, tasks of C3B of the queue 704d are run.

In at least one embodiment, requests from C3 tasks or threads can be initially placed in the queue 704d and scheduled to use the resource(s) of the WP 702. Once a C3 request is selected from 704d and scheduled for servicing using the resources of WP 702 and such processing has commenced execution, the C3 request execution or servicing using the resources of the WP 702 can be interrupted prior to completion in at least one embodiment, for example, if another C1 or C2 request arrives at WP 702. In this case, the interrupted C3 request can be temporarily placed on the queue 704c while the higher priority C1 or C2 request is serviced. Subsequently the interrupted or in-progress C3 (e.g., C3A) request on the queue 704c can once again obtain access to the one or more resources of the WP 702 for use in servicing the C3 request until such servicing and usage of the resources of WP 702 has completed. Thus, the queue 704c can include C3 requests which are in-progress and incomplete. It should be noted that in at least one embodiment, no new C3 request from the queue 704d is serviced until servicing of all in-progress C3 requests of the queue 704c have completed.

It should be noted that one or more of the queues 704a-d may be emptied in the course of running a scheduling cycle. For example, the C1 queue 704a may empty before C1 consumes its entire quota, at which point tasks from the C2 queue 704b may access and use the resources of the WP 702. C2 queue 704b may also empty before C2 consumes its entire quota, at which point C3 tasks from the queues 704c-d can access and use the resources of the WP 702. If, in the course of servicing lower-priority tasks, a new, higher-priority task is received in a class that has not used up its quota, the higher-priority task may be scheduled to access and use the resources of the WP next. Thus, higher-priority tasks can bump lower-priority tasks if the associated higher-priority classes have not consumed their quotas.

In at least one embodiment, C1, C2 and C3A corresponding respectively to the queues 704a-c can have non-zero quotas expressed in terms of percentages so that (SH1 for C1 queue 704a)+(SH2 for C2 queue 704b)+(SH3 for queue C3A 704c)=100% thereby denoting 100% of a scheduling cycle. In such an embodiment, the queue 704d of C3B BMT tasks has a zero quota (e.g., SH4=0) meaning that C3B tasks, threads or requests are not guaranteed any share of a scheduling cycle.

Figure 8B:
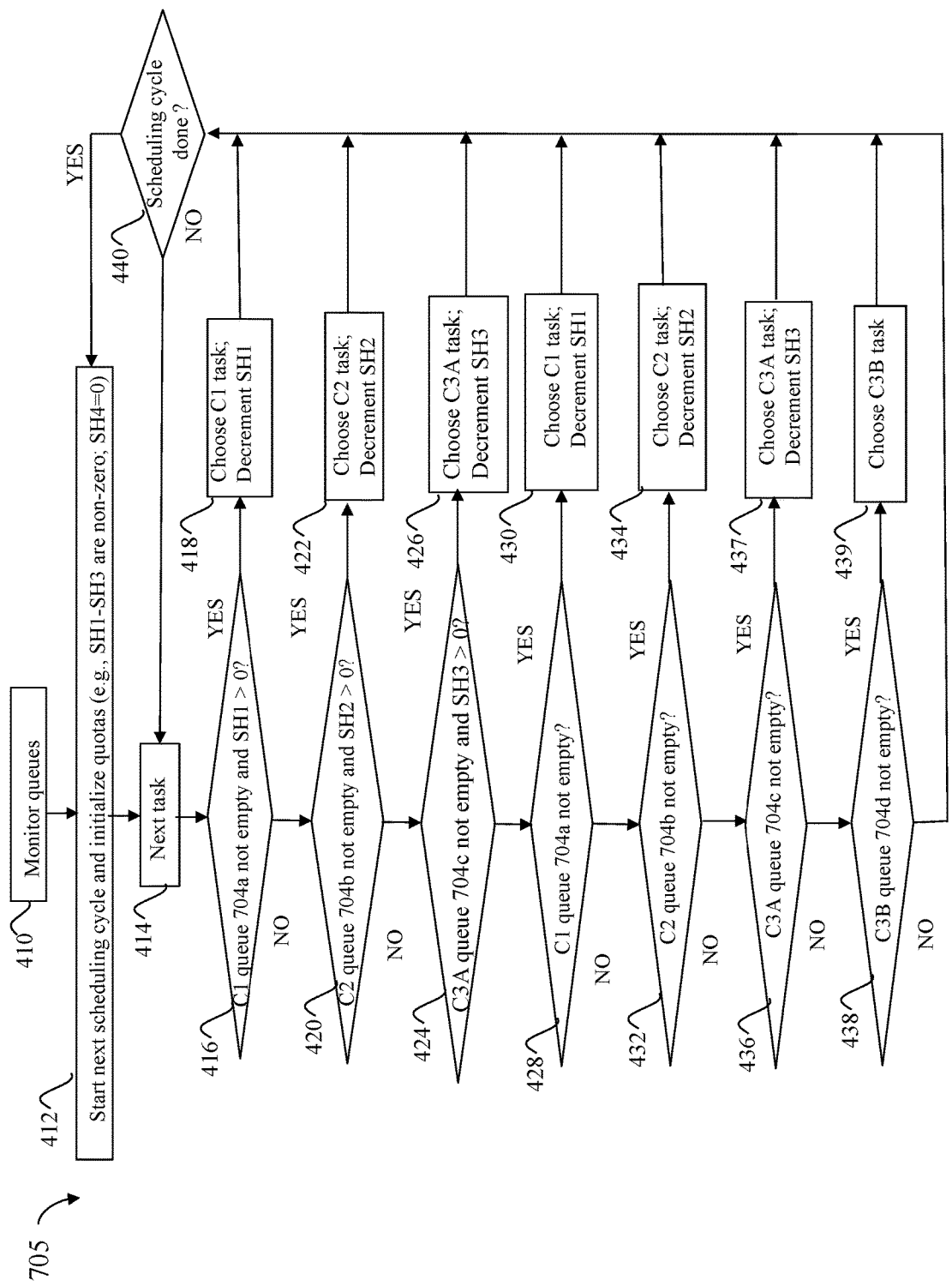

Referring to FIG. 8B, shown is a flowchart 705 of processing steps that can be performed in at least one embodiment implementing a WP with prioritization as illustrated in FIG. 8A. The flowchart 705 describes processing that can be performed to select requests from tasks or threads for servicing at the WP 702 where the selected request is provided access and usage to the one or more resources of the WP 702. In at least one embodiment, the processing of the flowchart 705 can be performed generally by a scheduler that selects and schedules requests, and thus tasks or threads, for servicing by the WP 702, where a task or thread making the selected request accesses and uses the one or more resources of the WP 702. Generally, the algorithm of FIG. 8B selects requests for servicing from the highest priority queue until empty or its associated quota is exceeded. If no request is selected for servicing, then the queues can be scanned for pending requests in order of priority but ignoring the established quotas.

At the step 410, processing can be performed to monitor the queues 704a-d. Such monitoring can include determining whether each such queue is empty. From the step 410, control proceeds to the step 412 to begin a new scheduling cycle. Starting the scheduling cycle can include involve initializing quotas SH1, SH2 and SH3, e.g., by setting them to established non-zero values. To illustrate, with a 500 microsecond cycle time, non-limiting examples of these values may be 40% (200 microseconds) for SH1 and 50% (250 microseconds) for SH2, and 10% for SH1 (50 microseconds). From the step 412, control proceeds to the step 414.

At the step 414, processing commences with selecting a new task or thread, and thus associated request, for servicing. From the step 414, control proceeds to the step 416 where processing determines whether the C1 queue 704a is not empty and whether SH1 is greater than zero. If the step 416 evaluates to yes, control proceeds to the step 418. At the step 418, processing is performed to select a C1 request and associated task from the queue 704a for servicing. Additionally in the step 418 SH1 can be decremented based on the amount of time the task or thread associated with the selected C1 request needs to use the resources of WP 702. In some embodiments, decrementing SH1, and more generally any quota, can occur after the selected request is serviced (e.g., once the runtime of the selected task or thread has been determined). Following the step 418 control proceeds to the step 440.

If the step 416 evaluates to no, control proceeds to the step 420 where a determination is made as to whether the C2 queue 704b is not empty and whether SH2 is greater than zero. If the step 420 evaluates to yes, control proceeds to the step 422. At the step 422, processing is performed to select a C2 request and associated task from the queue 704b for servicing. Additionally in the step 422 SH2 can be decremented based on the amount of time the task or thread associated with the selected C2 request needs to use the resources of WP 702. Following the step 422 control proceeds to the step 440.

If the step 420 evaluates to no, control proceeds to the step 424 where a determination is made as to whether the C3A queue 704c is not empty and whether SH3 is greater than zero. If the step 424 evaluates to yes, control proceeds to the step 426. At the step 426, processing is performed to select a C3A request and associated task from the queue 704c for servicing. Additionally in the step 426 SH3 can be decremented based on the amount of time the task or thread associated with the selected C3A request needs to use the resources of WP 702. Following the step 426 control proceeds to the step 440.

If the step 424 evaluates to no, control proceeds to the step 428 where a determination is made as to whether the C1 queue 704a is not empty. If the step 428 evaluates to yes, control proceeds to the step 430. At the step 430, processing is performed to select a C1 request and associated task from the queue 704a for servicing. Additionally, in the step 430 SH1 can be decremented based on the amount of time the task or thread associated with the selected C1 request needs to use the resource of WP 702. Following the step 430, control proceeds to the step 440.

If the step 428 evaluates to no, control proceeds to the step 432 where a determination is made as to whether the C2 queue 704b is not empty. If the step 432 evaluates to yes, control proceeds to the step 434. At the step 434, processing is performed to select a C2 request and associated task from the queue 704b for servicing. Additionally in the step 434, processing can decrement SH2 based on the amount of time the thread or task associated with the selected C2 request needs to use the resources of WP 702. Following the step 434, control proceeds to the step 440.

If the step 432 evaluates to no, control proceeds to the step 436 where a determination is made as to whether the C3A queue 704c is not empty. If the step 436 evaluates to yes, control proceeds to the step 437. At the step 437, processing is performed to select a C3A request and associated task from the queue 704c for servicing. Additionally, the step 437 can include decrementing SH3 based on the amount of time the thread or task associated with the selected C3A request needs to use the resources of WP 702. Following the step 437, control proceeds to the step 440.

If the step 436 evaluates to no, control proceeds to the step 438 where a determination is made as to whether the C3B queue 704d is not empty. If the step 438 evaluates to yes, control proceeds to the step 439. At the step 439 processing is performed to select a C3B request and associated task from the queue 704d for servicing. Following the step 439, control proceeds to the step 440. If the step 438 evaluates to no, control proceeds to the step 440.

After selection of a task, whether it be at the step 418, 422, 426, 430, 434, 437, or 439, control proceeds to the step 440. At the step 440, processing is performed to determine whether the current scheduling cycle is complete, e.g., whether the cycle time (e.g., 500 microseconds) has expired. If not, control proceeds to the step 414 to choose a new request, and associated task or thread, for servicing in the current scheduling cycle. Processing can continue as described above with selecting a next task and where such operation can repeat until the step 440 evaluates to yes indicating that the scheduling cycle has completed. If the step 440 evaluates to yes, control proceeds to the step 412, where a next scheduling cycle is started. Quotas SH1 and SH2 are reinitialized to properly account for share usage in the new scheduling cycle. Control then proceeds as previously described, and such processing can continue indefinitely.

Figure 9:
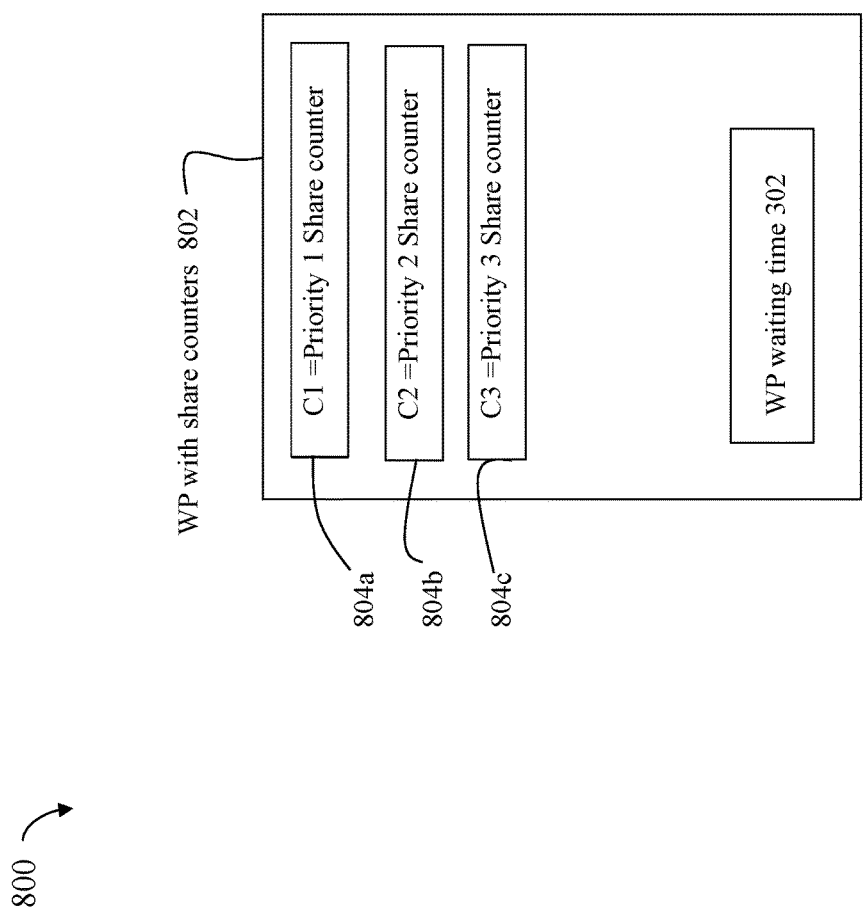

Referring to FIG. 9, shown is an example 800 illustrating a second type of WP, WP_type2, implementing the WP 802 without prioritization in at least one embodiment in accordance with the techniques of the present disclosure. The metrics 804a-c and 302 of FIG. 9 can be collected periodically as a set of feedback metrics.

The WP 802 can track share counters 804a-c respectively for the 3 priorities C1-C3. In particular, the share counter 804a can denote the count or frequency of the number of requests from tasks or threads of class C1 or priority 1; the share counter 804b can denote the count or frequency of the number of requests from tasks or threads of class C2 or priority 2; and the share counter 804ac can denote the count or frequency of the number of requests from tasks or threads of class C3 or priority 3.

The WP 802 can also track the WP waiting time 302 as discussed elsewhere herein such as in connection with FIG. 4.

In at least one embodiment, periodically the WP 802 can report, as feedback metrics to the maintenance BG regulator, the WP waiting time 302 and values of the share counters 804a-c for further evaluation by the maintenance BG regulator. Alternatively, the WP 802 can perform such evaluation of the feedback metrics 804a-c and 302 and then notify the maintenance BG regulator as needed based on the result of the evaluation. In at least one embodiment, the evaluation can be performed using the criteria similar to that as described, for example, in connection with the step 506 of FIG. 6. In particular, the criteria can determine for the WP 802 1) whether the associated WP waiting time 302 exceeds an associated maximum waiting time and 2) whether the share or percentage of maintenance BG requests exceeds an associated minimum percentage. In connection with the WP 802, the share or percentage of maintenance BG requests for a current time period (during which a set of feedback metrics 804a-c and 302 is collected) can be determined as a ratio of the value of 804c with respect to a sum, where the sum is the aggregate or total number of requests received at the WP 802 and where the sum can be determined by adding counter values 804a-c.

If the criteria associated with a set of feedback metrics of the 802 evaluates to yes or true, the maintenance BG regulator can perform processing to reduce maintenance BG (Class C3) activity in a manner similar to that as described elsewhere herein.

In at least one embodiment implementing the WP 802 of FIG. 9, incoming requests received at the WP 802 can be serviced in accordance with a FIFO ordering in which the requests are received at the WP 802 (e.g., without prioritization).

Figure 10:
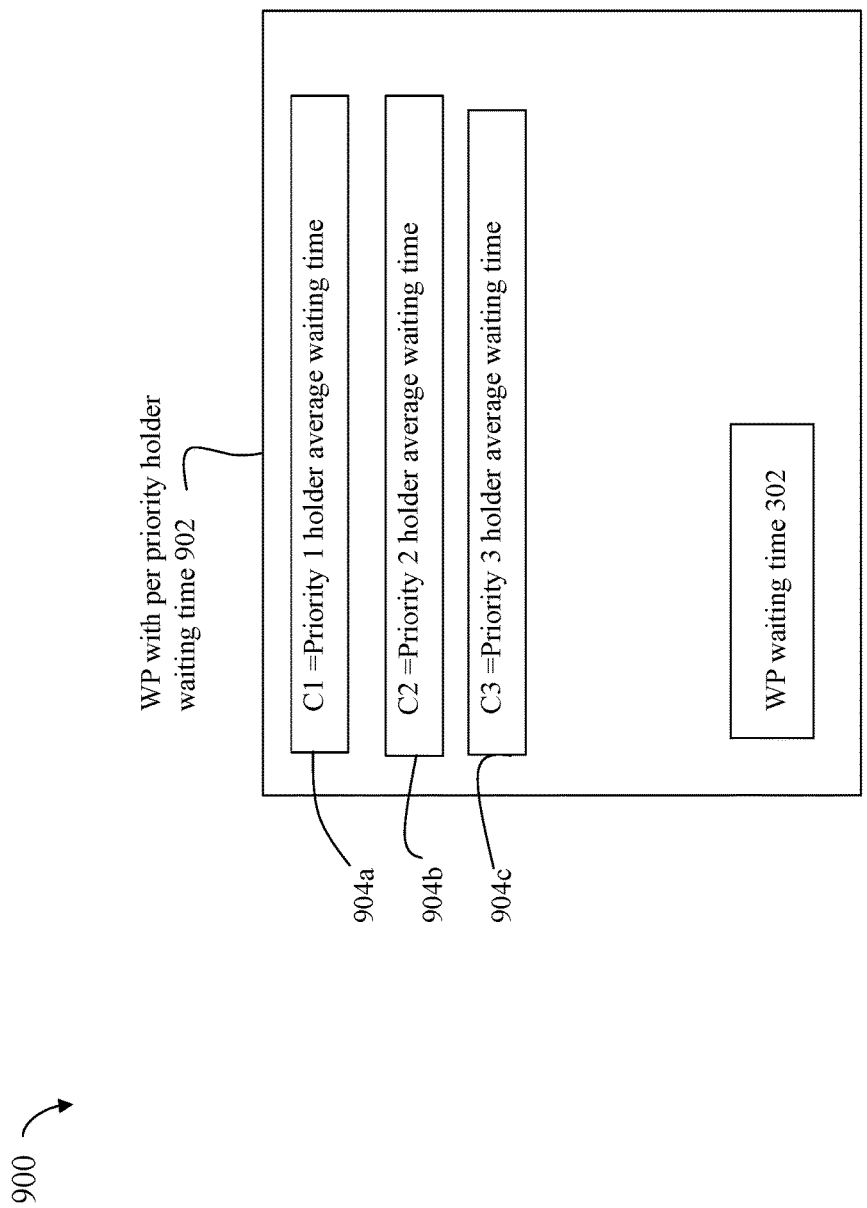

Referring to FIG. 10, shown is an example 900 illustrating a third type of WP, WP_type3, implementing the WP 902 without prioritization in at least one embodiment in accordance with the techniques of the present disclosure. The metrics 904a-c and 302 of FIG. 10 can be collected periodically as a set of feedback metrics.

The WP 902 can be implemented in connection with a lock associated with a shared resource. The WP 902 can monitor how long an incoming request waits for a current holder of the lock to release the lock. The current holder of the lock is generally a task or request which has an associated one of the classes C1-C3. In this manner for one time period during which a set of feedback metrics is collected, the WP 902 can track the average amount of time a requester waits for a C1 task or thread to release the lock 904a (C1 or priority 1 holder average waiting time 904a); the average amount of time a requester waits for a C2 task or thread to release the lock 904b (C2 or priority 2 holder average waiting time 904b); and the average amount of time a requester waits for a C3 task or thread to release the lock 904c (C3 or priority 3 holder average waiting time 904c).

The WP 902 can also track the WP waiting time 302 as discussed elsewhere herein such as in connection with FIG. 4.

In at least one embodiment, periodically the WP 902 can report, as feedback metrics to the maintenance BG regulator, the WP waiting time 302 and values of the per holder class waiting times 904a-c for further evaluation by the maintenance BG regulator. Alternatively, the WP 902 can perform such evaluation of the feedback metrics 904a-c and 302 and then notify the maintenance BG regulator as needed based on the result of the evaluation. In at least one embodiment, the evaluation can be performed using second criteria similar to that as described, for example, in connection with the step 506 of FIG. 6. In particular, the second criteria can determine for the WP 902 1) whether the associated WP waiting time 302 exceeds an associated maximum waiting time and 2) whether the share or percentage of the C3 class wait time associated with maintenance BG requests exceeds an associated minimum percentage. In connection with the WP 902, the share or percentage of the C3 class wait time associated with maintenance BG requests for a current time period (during which a set of feedback metrics 904*a-c* and 302 is collected) can be determined as a ratio of the value of 904*c* with respect to a sum, where the sum is the aggregate or total amount of time which an incoming request received at the WP 902 waits for the lock, where the sum can be determined by adding the waiting time values 904*a-c*.

If the second criteria associated with a set of feedback metrics of the 902 evaluates to yes or true, the maintenance BG regulator can perform processing to reduce maintenance BG (Class C3) activity in a manner similar to that as described elsewhere herein.

In at least one embodiment implementing the WP 902 of FIG. 10, incoming requests received at the WP 902 can be serviced in accordance with a FIFO ordering in which the requests are received at the WP 902 (e.g., without prioritization).

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method of managing resource utilization in a data storage system, the method comprising:
    collecting a plurality of sets of feedback metrics for a plurality of waiting points (WPs) instantiated in the data storage system, wherein each WP of the plurality of WPs is instrumented to collect a corresponding one of the plurality of sets of feedback metrics at said each WP, wherein each set of feedback metrics of the plurality of sets associated with one WP of the plurality of WPs includes an average waiting time for said one WP and includes a first percentage for said one WP, wherein the average waiting time for said one WP denotes an average amount of time a task waits for one or more resources at said one WP and wherein the first percentage denotes a share or portion of resource requests received at said one WP which are from maintenance background (BG) tasks running on the data storage system;
    determining, in accordance with criteria and said plurality of sets of feedback metrics, whether said criteria is true for at least a first WP of the plurality of WPs for which a first set of the plurality of sets of feedback metrics is collected, wherein said criteria includes determining whether said first WP has an associated average waiting time of the first set which exceeds a waiting time threshold, and wherein said criteria includes determining whether said first percentage of the first set exceeds a minimum percentage; and
    responsive to determining that said criteria is true for at least the first WP, performing first processing to reduce a current activity level of said maintenance BG tasks running on the data storage system, thereby increasing available resources in the data storage system.

2. The computer-implemented method of claim 1, wherein each WP of the plurality of WPs denotes a workflow processing point in I/O operation workflow processing where a task waits to access one or more resources, wherein a first task waiting at said first WP is waiting to access first one or more resources at a first workflow processing point and issues a corresponding first request to access said first one or more resources at the first workflow processing point, and wherein said corresponding first request is placed on a first queue associated with said first WP.

3. The computer-implemented method of claim 1, wherein said first processing is performed by a regulator that controls and regulates the current activity level of maintenance BG tasks.

4. The computer-implemented method of claim 3, wherein said first processing includes said regulator performing one or more actions to reduce the current activity level of maintenance BG tasks.

5. The computer-implemented method of claim 4, wherein said first processing includes the regulator not creating any additional maintenance BG task instances for scheduling and execution on the data storage system until a predefined criterion is detected as true.

6. The computer-implemented method of claim 4, wherein said first processing includes the regulator reducing a number of maintenance BG task instances created for scheduling and execution.

7. The computer-implemented method of claim 4, wherein said first processing includes the regulator notifying a scheduler to stop dequeuing for execution instances of maintenance BG tasks which are ready and waiting for execution.

8. The computer-implemented method of claim 4, wherein said regulator uses a first table of information denoting resources acquired at the plurality of WPs and uses a second table of information denoting required resources used by a plurality of maintenance BG task types.

9. The computer-implemented method of claim 8, wherein the first table of information indicates, for each of the plurality of WPs, one or more resources acquired at said each WP.

10. The computer-implemented method of claim 9, wherein the second table of information indicates, for each task type of the plurality of maintenance BG task types, one or more resources required or used by task instances of said each task type.

11. The computer-implemented method of claim 10, wherein said regulator uses the first table to determine, for the first WP, a first resource set of one or more resources acquired at said first WP.

12. The computer-implemented method of claim 11, wherein said regulator uses the second table to determine a first task type of the plurality of maintenance BG task types which does not use any resource in the first resource set associated with the first WP.

13. The computer-implemented method of claim 12, wherein said regulator does not perform any action to reduce a first current activity level of maintenance BG tasks instances of the first task type.

14. The computer-implemented method of claim 13, wherein said regulator continues to create and schedule for execution maintenance BG task instances of the first task type in order to maintain the first current activity level.

15. The computer-implemented method of claim 11, wherein said regulator uses the second table to determine a second task type of the plurality of maintenance BG task types which does use one or more of the resources in the first resource set associated with the first WP.

16. The computer-implemented method of claim 15, wherein said regulator performs one or more actions to reduce a second current activity level of maintenance BG tasks instances of the second task type.

17. The computer-implemented method of claim 16, wherein said one or more actions includes a first action where the regulator stops creating for execution maintenance BG task instances of the second task type.

18. The computer-implemented method of claim 16, wherein said first processing includes the regulator notifying a scheduler to stop dequeuing for execution instances of maintenance BG tasks of the second task type which are ready and waiting for execution.

19. A system comprising:
one or more processors; and
a memory comprising code stored thereon that, when executed, performs a method of managing resource utilization in a data storage system, the method comprising:
collecting a plurality of sets of feedback metrics for a plurality of waiting points (WPs) instantiated in the data storage system, wherein each WP of the plurality of WPs is instrumented to collect a corresponding one of the plurality of sets of feedback metrics at said each WP, wherein each set of feedback metrics of the plurality of sets associated with one WP of the plurality of WPs includes an average waiting time for said one WP and includes a first percentage for said one WP, wherein the average waiting time for said one WP denotes an average amount of time a task waits for one or more resources at said one WP and wherein the first percentage denotes a share or portion of resource requests received at said one WP which are from maintenance background (BG) tasks running on the data storage system;
determining, in accordance with criteria and said plurality of sets of feedback metrics, whether said criteria is true for at least a first WP of the plurality of WPs for which a first set of the plurality of sets of feedback metrics is collected, wherein said criteria includes determining whether said first WP has an associated average waiting time of the first set which exceeds a waiting time threshold, and wherein said criteria includes determining whether said first percentage of the first set exceeds a minimum percentage; and
responsive to determining that said criteria is true for at least the first WP, performing first processing to reduce a current activity level of said maintenance BG tasks running on the data storage system, thereby increasing available resources in the data storage system.

20. A non-transitory computer readable medium comprising code stored thereon that, when executed, performs a method of managing resource utilization in a data storage system, the method comprising:
collecting a plurality of sets of feedback metrics for a plurality of waiting points (WPs) instantiated in the data storage system, wherein each WP of the plurality of WPs is instrumented to collect a corresponding one of the plurality of sets of feedback metrics at said each WP, wherein each set of feedback metrics of the plurality of sets associated with one WP of the plurality of WPs includes an average waiting time for said one WP and includes a first percentage for said one WP, wherein the average waiting time for said one WP denotes an average amount of time a task waits for one or more resources at said one WP and wherein the first percentage denotes a share or portion of resource requests received at said one WP which are from maintenance background (BG) tasks running on the data storage system;
determining, in accordance with criteria and said plurality of sets of feedback metrics, whether said criteria is true for at least a first WP of the plurality of WPs for which a first set of the plurality of sets of feedback metrics is collected, wherein said criteria includes determining whether said first WP has an associated average waiting time of the first set which exceeds a waiting time threshold, and wherein said criteria includes determining whether said first percentage of the first set exceeds a minimum percentage; and
responsive to determining that said criteria is true for at least the first WP, performing first processing to reduce a current activity level of said maintenance BG tasks running on the data storage system, thereby increasing available resources in the data storage system.

* * * * *